US012586407B2

(12) United States Patent
Kimura

(10) Patent No.: US 12,586,407 B2
(45) Date of Patent: Mar. 24, 2026

(54) IMAGE PROCESSING DEVICE, IMAGE PROCESSING METHOD, AND STORAGE MEDIUM FOR ADJUSTING IMAGE PARAMETERS

(71) Applicant: CANON KABUSHIKI KAISHA, Tokyo (JP)

(72) Inventor: Takato Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 18/449,732

(22) Filed: Aug. 15, 2023

(65) Prior Publication Data

US 2024/0071130 A1 Feb. 29, 2024

(30) Foreign Application Priority Data

Aug. 29, 2022 (JP) ................................. 2022-135676

(51) Int. Cl.
*G06V 40/16* (2022.01)
*G06T 7/73* (2017.01)
(Continued)

(52) U.S. Cl.
CPC .............. *G06V 40/168* (2022.01); *G06T 7/73* (2017.01); *G06V 10/26* (2022.01); *G06V 10/764* (2022.01);
(Continued)

(58) Field of Classification Search
CPC ............. G06T 7/73; G06T 2207/20021; G06T 2207/20081; G06T 2207/30201;
(Continued)

(56) References Cited

U.S. PATENT DOCUMENTS 11,113,602 B2 9/2021 Shazeer et al.
2018/0341860 A1* 11/2018 Shazeer ................... G06N 3/08
(Continued)

FOREIGN PATENT DOCUMENTS

JP 6884871 B2 6/2021

OTHER PUBLICATIONS

Zhong, Y. et al., "Face Transformer for Recognition" arXiv.org (Mar. 2021) pp. 1-5.
(Continued)

*Primary Examiner* — Stephen G Sherman
(74) *Attorney, Agent, or Firm* — Carter, DeLuca & Farrell LLP

(57) ABSTRACT

An image processing device including a processor or circuit configured to: acquire an input image; divide the input image into a plurality of partial images to obtain a partial image sequence; convert the partial image sequence into a token sequence by respectively converting each of the partial images includes in the partial image sequence into a token having a fixed-dimensional vector; obtain an encoded representation sequence based on an attention map indicating a degree of association between tokens and the token sequence; obtain a feature vector from the encoded representation sequence; and adjust at least parameters of the feature vector to reduce an attention loss value. The attention loss value corresponds to an error between a target value of the degree of association between the partial images and a value indicated by the attention map.

12 Claims, 21 Drawing Sheets

(51) Int. Cl.

| | |
|---|---|
| *G06V 10/26* | (2022.01) |
| *G06V 10/764* | (2022.01) |
| *G06V 10/77* | (2022.01) |
| *G06V 10/776* | (2022.01) |
| *G06V 10/82* | (2022.01) |

(52) U.S. Cl.
CPC ........ *G06V 10/7715* (2022.01); *G06V 10/776* (2022.01); *G06V 10/82* (2022.01); *G06V 40/161* (2022.01); *G06V 40/172* (2022.01); *G06T 2207/20021* (2013.01); *G06T 2207/20081* (2013.01); *G06T 2207/30201* (2013.01)

(58) Field of Classification Search
CPC ......... G06V 40/168172; G06V 40/161; G06V 10/82; G06V 10/26; G06V 10/776; G06V 10/764; G06V 10/7715
See application file for complete search history.

(56) References Cited

U.S. PATENT DOCUMENTS

| | | | | |
|---|---|---|---|---|
| 2022/0036564 | A1* | 2/2022 | Ye | G06T 7/11 |
| 2022/0075994 | A1* | 3/2022 | Shapira | G06F 18/214 |
| 2023/0077498 | A1 | 3/2023 | Kimura | |
| 2023/0196714 | A1* | 6/2023 | Bamba | G06V 10/32 382/190 |

OTHER PUBLICATIONS

Patro Badri, N. et al., "Self Supervision for Attention Networks" IEEE Winter Conference on Applications of Computer Vision (WACV) (Jan. 2021) pp. 726-735.

Mao, X. et al., "Towards Robust Vision Transformer" IEEE/CVF Conference on Computer Vision and Pattern Recognition (CVPR) (Jun. 2022) pp. 12032-12041.

Extended European Search Report issued by the European Patent Office on Jan. 15, 2024 in corresponding EP Patent Application No. 23189403.1.

Dosovitskiy, A. et al., "An Image Is Worth 16x16 Words: Transformers for Image Recognition at Scale" ICLR 2021: The Ninth International Conference on Learning Representations, arXiv:2010.11929v2 (Jun. 2021) pp. 1-22.

Zhong, Y. et al., "Face Transformer for Recognition" arXiv:2013.14803v2 (Apr. 2021) pp. 1-5.

Carion, N. et al., "End-to-End Object Detection with Transformers" In European Conference on Computer Vision, arXiv:2005.12872v3 (May 2020) pp. 213-229.

Deng, J. et al., "ArcFace: Additive Angular Margin Loss for Deep Face Recognition" CVPR, arXiv:1801.07698v1 (Jan. 2018) pp. 1-13.

Mao, X. et al., "Towards Robust Vision Transformer" ArXiv:2105.07926 (May 2021) pp. 12042-12051.

Office Action issued by the European Patent Office on Oct. 8, 2025 in corresponding EP Patent Application No. 23189403.1.

* cited by examiner

FIG. 7

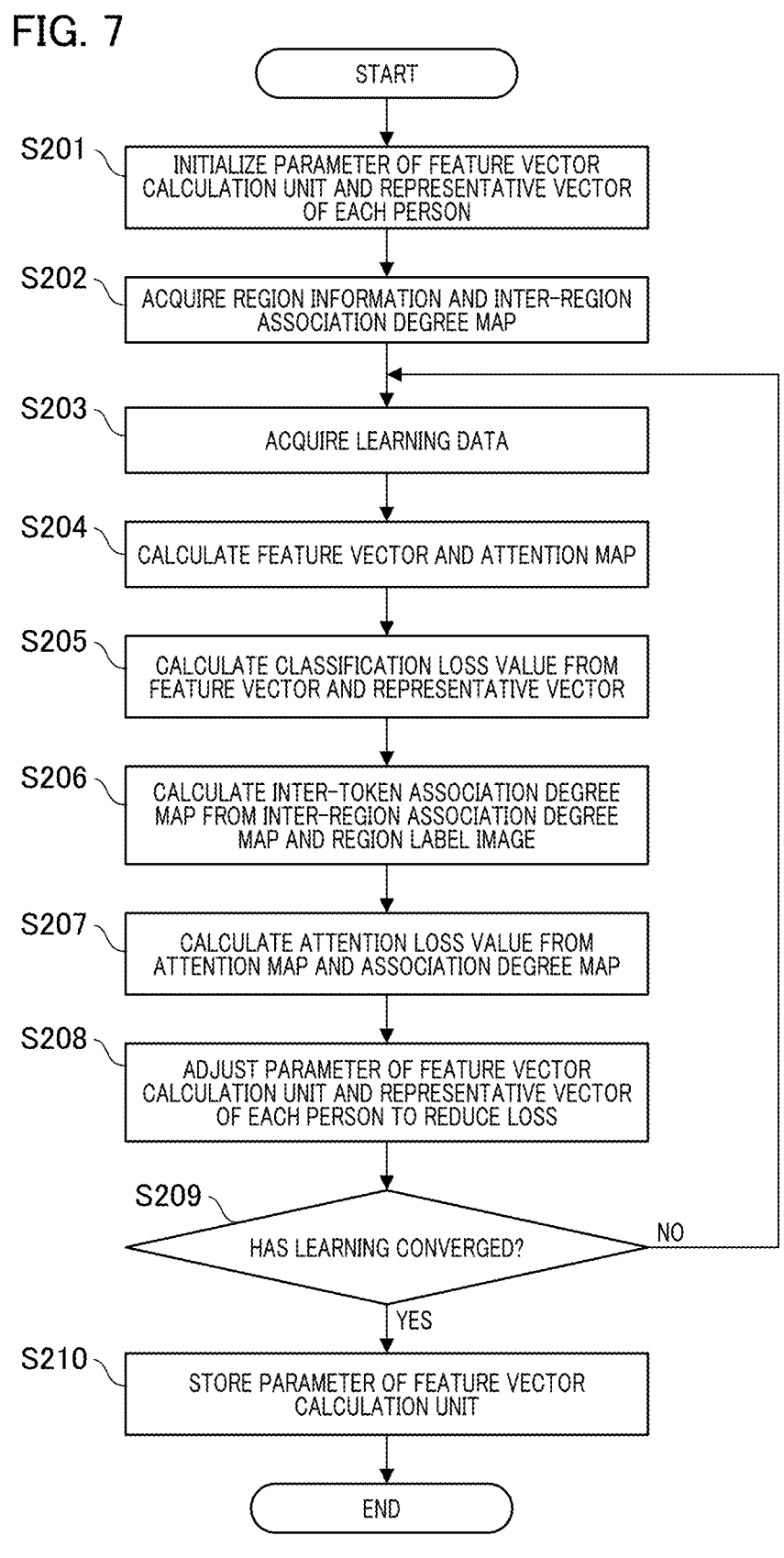

START

S201 — INITIALIZE PARAMETER OF FEATURE VECTOR CALCULATION UNIT AND REPRESENTATIVE VECTOR OF EACH PERSON

S202 — ACQUIRE REGION INFORMATION AND INTER-REGION ASSOCIATION DEGREE MAP

S203 — ACQUIRE LEARNING DATA

S204 — CALCULATE FEATURE VECTOR AND ATTENTION MAP

S205 — CALCULATE CLASSIFICATION LOSS VALUE FROM FEATURE VECTOR AND REPRESENTATIVE VECTOR

S206 — CALCULATE INTER-TOKEN ASSOCIATION DEGREE MAP FROM INTER-REGION ASSOCIATION DEGREE MAP AND REGION LABEL IMAGE

S207 — CALCULATE ATTENTION LOSS VALUE FROM ATTENTION MAP AND ASSOCIATION DEGREE MAP

S208 — ADJUST PARAMETER OF FEATURE VECTOR CALCULATION UNIT AND REPRESENTATIVE VECTOR OF EACH PERSON TO REDUCE LOSS

S209 — HAS LEARNING CONVERGED?    NO

YES

S210 — STORE PARAMETER OF FEATURE VECTOR CALCULATION UNIT

END

801

| Region | Label ID |
|--------|----------|
| Black | 2 |
| Mask | 3 |
| Face center | 4 |
| Normal region | 1 |

802

803

FIG. 9
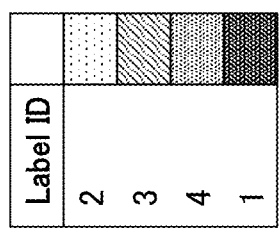
| Label ID | |
|---|---|
| 2 | |
| 3 | |
| 4 | |
| 1 | |
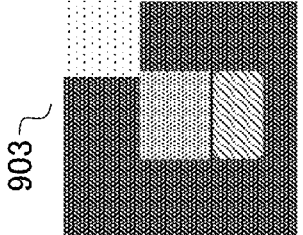
903
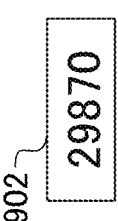
902
29870
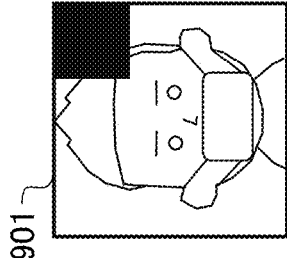
901

1001

FIG. 13
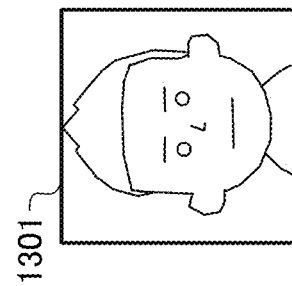
1301
1302
29870
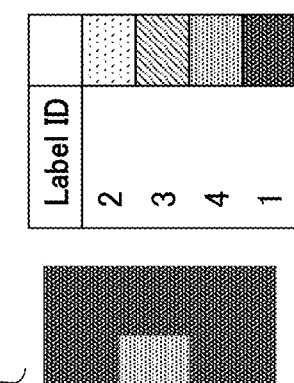
1303
| Label ID | |
|---|---|
| 2 | |
| 3 | |
| 4 | |
| 1 | |

FIG. 14

| Label ID | |
|----------|--|
| 2 | |
| 3 | |
| 4 | |
| 1 | |

Image synthesis

| Label ID | |
|----------|--|
| 2 | |
| 3 | |
| 4 | |
| 1 | |

START

ACQUIRE FEATURE VECTOR   S1701

ESTIMATE DETECTION LIKELIHOOD OF FACE AND POSITION INFORMATION ON CIRCUMSCRIBED RECTANGULAR REGION OF FACE   S1702

END

FIG. 20

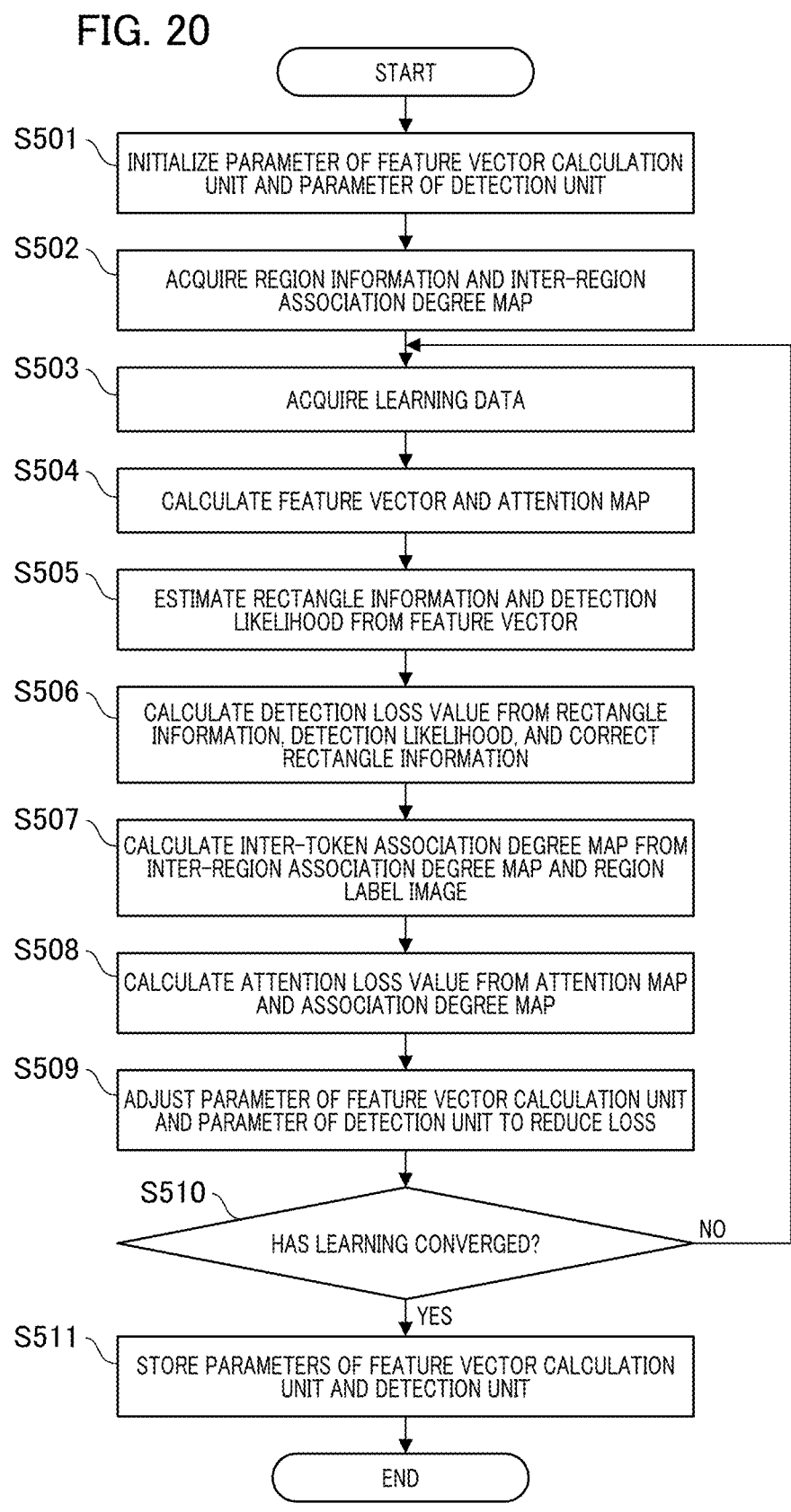

START

S501　INITIALIZE PARAMETER OF FEATURE VECTOR CALCULATION UNIT AND PARAMETER OF DETECTION UNIT

S502　ACQUIRE REGION INFORMATION AND INTER-REGION ASSOCIATION DEGREE MAP

S503　ACQUIRE LEARNING DATA

S504　CALCULATE FEATURE VECTOR AND ATTENTION MAP

S505　ESTIMATE RECTANGLE INFORMATION AND DETECTION LIKELIHOOD FROM FEATURE VECTOR

S506　CALCULATE DETECTION LOSS VALUE FROM RECTANGLE INFORMATION, DETECTION LIKELIHOOD, AND CORRECT RECTANGLE INFORMATION

S507　CALCULATE INTER-TOKEN ASSOCIATION DEGREE MAP FROM INTER-REGION ASSOCIATION DEGREE MAP AND REGION LABEL IMAGE

S508　CALCULATE ATTENTION LOSS VALUE FROM ATTENTION MAP AND ASSOCIATION DEGREE MAP

S509　ADJUST PARAMETER OF FEATURE VECTOR CALCULATION UNIT AND PARAMETER OF DETECTION UNIT TO REDUCE LOSS

S510　HAS LEARNING CONVERGED?　NO

YES

S511　STORE PARAMETERS OF FEATURE VECTOR CALCULATION UNIT AND DETECTION UNIT

END

FIG. 21
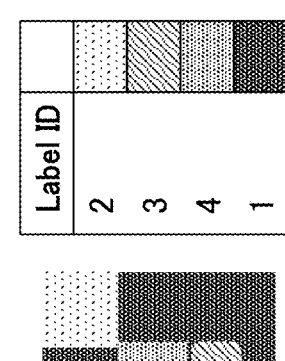
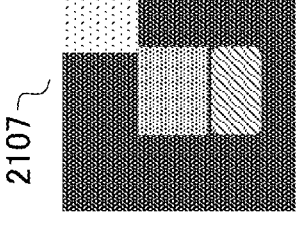
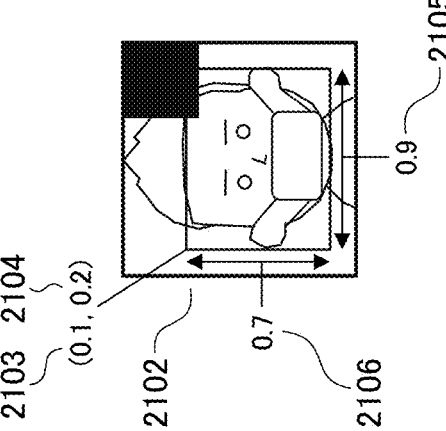
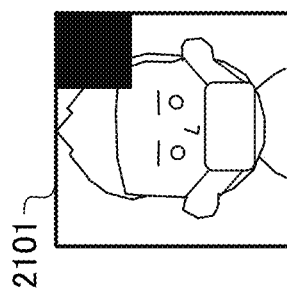

IMAGE PROCESSING DEVICE, IMAGE PROCESSING METHOD, AND STORAGE MEDIUM FOR ADJUSTING IMAGE PARAMETERS

BACKGROUND OF THE INVENTION

Field of the Invention

The present invention relates to an image processing device, an image processing method, and a storage medium.

Description of the Related Art

Many feature extractors that extract information useful for solving a target task from an image as feature vectors have been proposed. Among them, feature extractors using a convolutional neural network (hereinafter referred to as a CNN) which is a method of a deep neural network (hereinafter referred to as a DNN) have conventionally shown high performance.

Literature 1 (Dosovitskiy, Alexey, et al. An Image Is Worth 16×16 Words: Transformers for Image Recognition at Scale. ICLR 2021: The Ninth International Conference on Learning Representations, 2021) proposes a vision transformer (hereinafter referred to as a ViT) in which a DNN called a transformer as disclosed in Japanese Patent No. 6884871 which has been widely used in the field of natural language processing is applied to image recognition. A ViT-based feature extractor has been shown to outperform a CNN-based feature extractor in an image classification task.

In Literature 2 (Zhong, Y, & Deng, W. (2021). Face Transformer for Recognition. arXiv preprint arXiv: 2103.14803), a ViT-based feature extractor is applied to a face authentication task and thus shows performance equivalent to that of a CNN-based feature extractor. In addition, in Literature 3 (Carion, N., Massa, F., Synnaeve, G., Usunier, N., Kirillov, A., & Zagoruyko, S. (2020). End-to-End OBJECT Detection with Transformers. In European Conference on Computer Vision (pp. 213-229).), a ViT-based feature extractor is applied to an object detection task and thus shows performance equivalent to that of a CNN-based feature extractor. In addition, Literature 4 (Deng, et. Al. ArcFace: Additive Angular Margin Loss for Deep Face Recognition. In CVPR, 2019) shows a general learning method using a representative vector method.

A ViT extracts features from each partial image in an image by means of a plurality of self-attention mechanisms. Further, when the feature of a certain partial image is extracted, it generates a map called an attention map having information on how much attention should be paid to other partial images. A feature vector is then calculated by repeating a process of concentrating the features of each partial image on the basis of the attention map.

If an input image of a ViT contains regions having information unnecessary for recognition (such as, for example, concealment by an object in the case of face authentication), each self-attention of the ViT focuses on partial images containing those regions and collects information unnecessary for recognition. Thereby, there is a problem in that less attention is paid to partial images containing regions having relatively important information for recognition (such as, for example, regions including facial organs in the case of face authentication), and sufficient information important for recognition cannot be collected, which leads to a decrease in the performance of recognition.

In Literature 5 (Mao, X., Qi, G., Chen, Y., Li, X., Duan, R., Ye, S., Xue, H. (2021). Towards Robust Vision Transformer. ArXiv Preprint ArXiv: 2105.07926), a weighted map of the same size as an attention map is acquired through learning, and the attention map generated by self-attention is multiplied by the weighted map. Thereby, the relevance between partial images with low positional relevance (for example, image center and image edge) is lowered to enhance robustness against position-dependent noise. However, it is difficult to improve robustness against noise with low position dependence (such as, for example, concealment by an object in the case of face authentication).

SUMMARY OF THE INVENTION

According to an aspect of the present invention, there is provided an image processing device includes an image acquisition unit configured to acquire an input image; a division unit configured to divide the input image into a plurality of partial images to obtain a partial image sequence; a token conversion unit configured to convert the partial image sequence into a token sequence by respectively converting each of the partial images includes in the partial image sequence into a token having a fixed-dimensional vector; an encoding unit configured to obtain an encoded representation sequence based on an attention map indicating a degree of association between tokens and the token sequence; a feature vector acquisition unit configured to obtain a feature vector from the encoded representation sequence obtained by the encoding unit; and a learning unit configured to adjust at least parameters of the feature vector to reduce an attention loss value, wherein the attention loss value corresponds to an error between a target value of the degree of association between the partial images and a value indicated by the attention map calculated by the encoding unit.

Further features of the present invention will become apparent from the following description of embodiments with reference to the attached drawings.

BRIEF DESCRIPTION OF THE DRAWINGS

FIG. 7 is a flowchart illustrating a procedure of a learning process of the first embodiment.

FIG. 9 is a schematic diagram of a face image set of the first embodiment.

FIG. 13 is a schematic diagram of a face image set of the second embodiment.

FIG. 14 is a schematic diagram illustrating a procedure of an image synthesis process of the second embodiment.

FIG. 20 is a flowchart illustrating a procedure of a learning process of the third embodiment.

FIG. 21 is a schematic diagram of a face image set of the third embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

In the following first embodiment and second embodiment, a task of calculating a feature vector for specifying the identity of one person's face from an image of the face (hereinafter referred to as a face image) (hereinafter referred to as face authentication) will be described as an example.

First Embodiment

Figure 1:
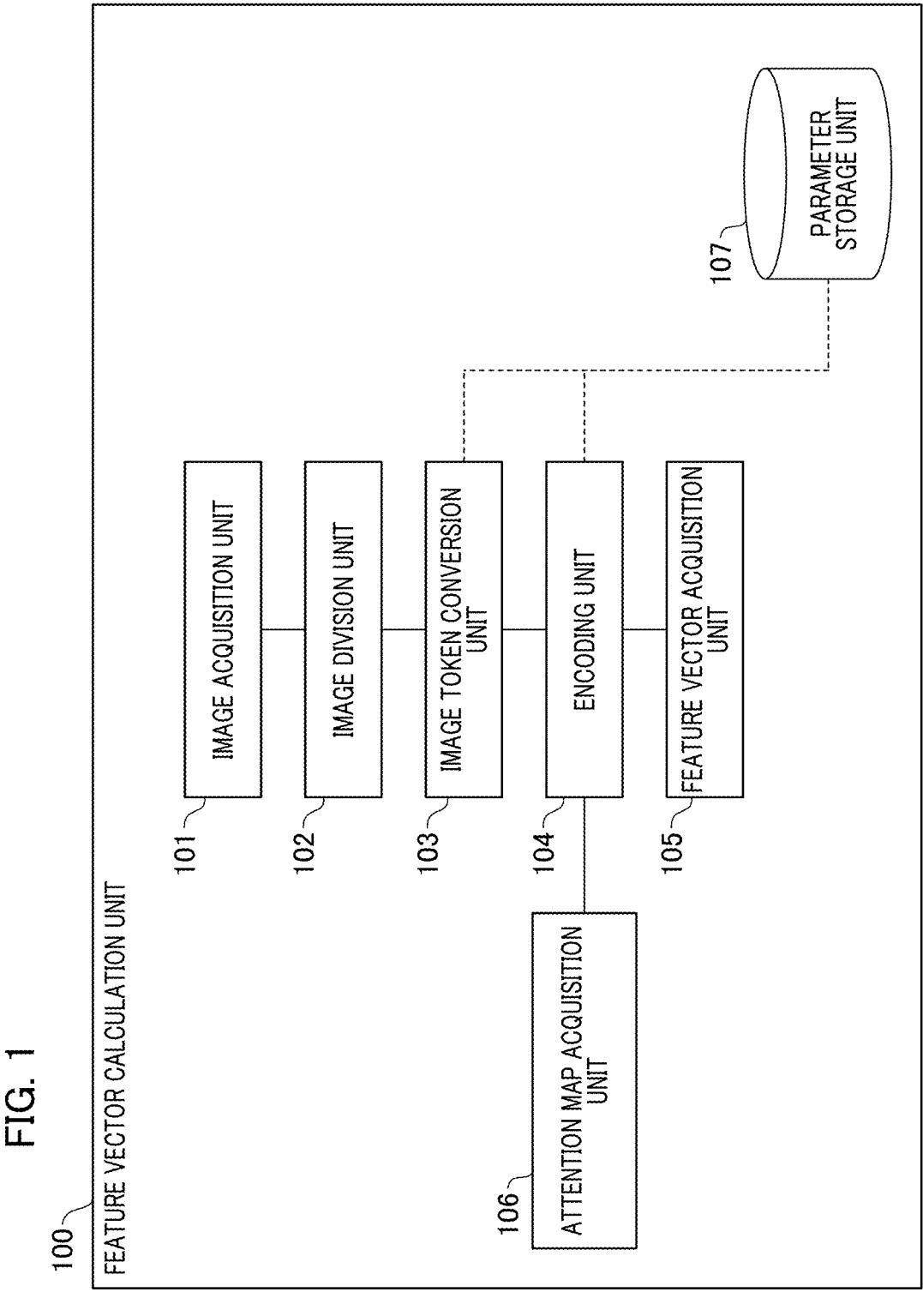
FIG. 1 is a functional block diagram illustrating a configuration example of a feature vector calculation unit included in a learning unit serving as an image processing device of a first embodiment.

A feature vector calculation process of calculating a feature vector from a face image and a learning process in a first embodiment will be described below. FIG. 1 is a functional block diagram illustrating a configuration example of a feature vector calculation unit included in a learning unit serving as an image processing device in the first embodiment.

Meanwhile, some of the functional blocks shown in FIG. 1 are realized by causing a computer (not shown) included in an image processing device to execute a computer program stored in a memory serving as a storage medium (not shown).

However, some or all of them may be realized by hardware. Examples of the hardware capable of being used include a dedicated circuit (ASIC), a processor (reconfigurable processor, DSP), and the like.

In addition, the functional blocks shown in FIG. 1 may not be built into the same housing, and may be constituted by separate devices connected to each other through signal paths. Meanwhile, the above description of FIG. 1 applies equally to FIGS. 6, 11, 16, and 19.

A feature vector calculation unit 100 includes an image acquisition unit 101, an image division unit 102, an image token conversion unit 103, an encoding unit 104, a feature vector acquisition unit 105, an attention map acquisition unit 106, and a parameter storage unit 107. Meanwhile, the image division unit 102 divides an input image into a plurality of partial images to obtain a partial image sequence.

In addition, the image token conversion unit 103 converts the partial image sequence into a token sequence by respectively converting each of the partial images included in the partial image sequence into a token having a fixed-dimensional vector. In addition, the encoding unit 104 obtains an encoded representation sequence by updating the token sequence on the basis of an attention map indicating the degree of association between tokens.

In addition, the feature vector acquisition unit 105 obtains a feature vector from the encoded representation sequence. The attention map acquisition unit 106 acquires an attention map generated by the encoding unit 104 and indicating the degree of association which is the degree of relevance between tokens.

Meanwhile, a learning unit serving as an image processing device to be described later in FIG. 6 has a built-in CPU serving as a computer, which functions as a control unit that controls the operation of each unit of the entire image processing device on the basis of a computer program stored in a memory serving as a storage medium.

Figure 2:
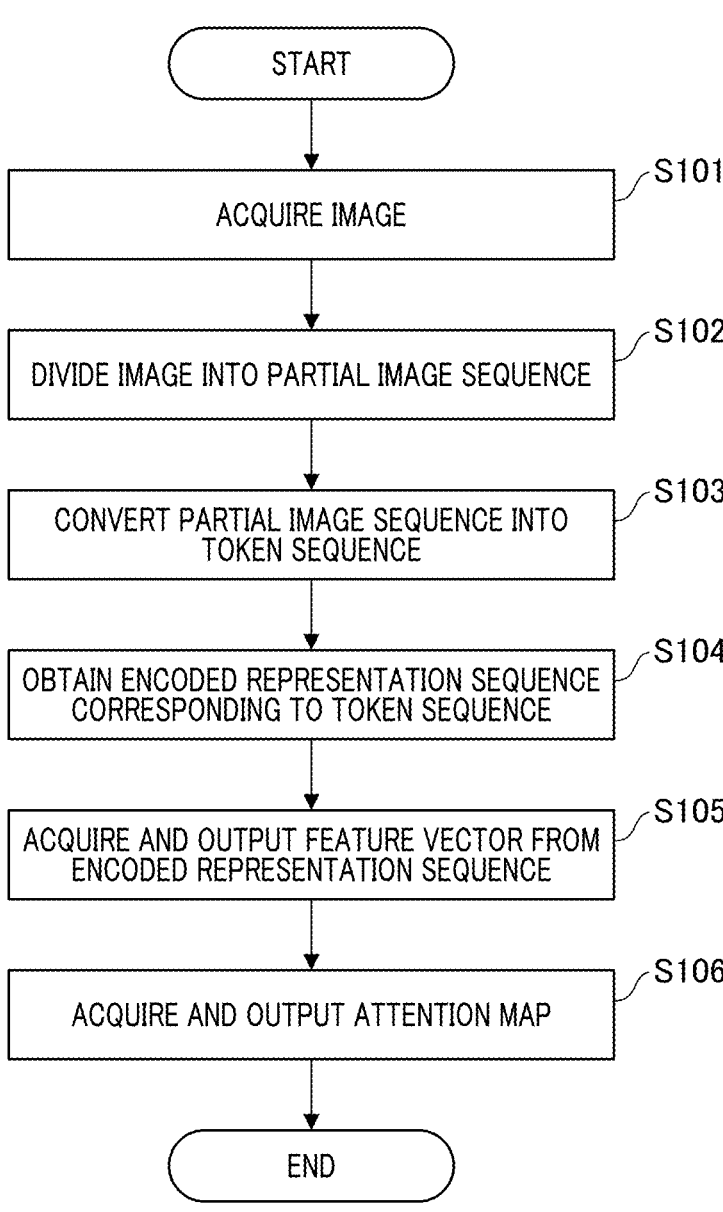
FIG. 2 is a flowchart illustrating a flow of a feature vector calculation process of calculating a feature vector from a face image in the first embodiment.
Figure 3:
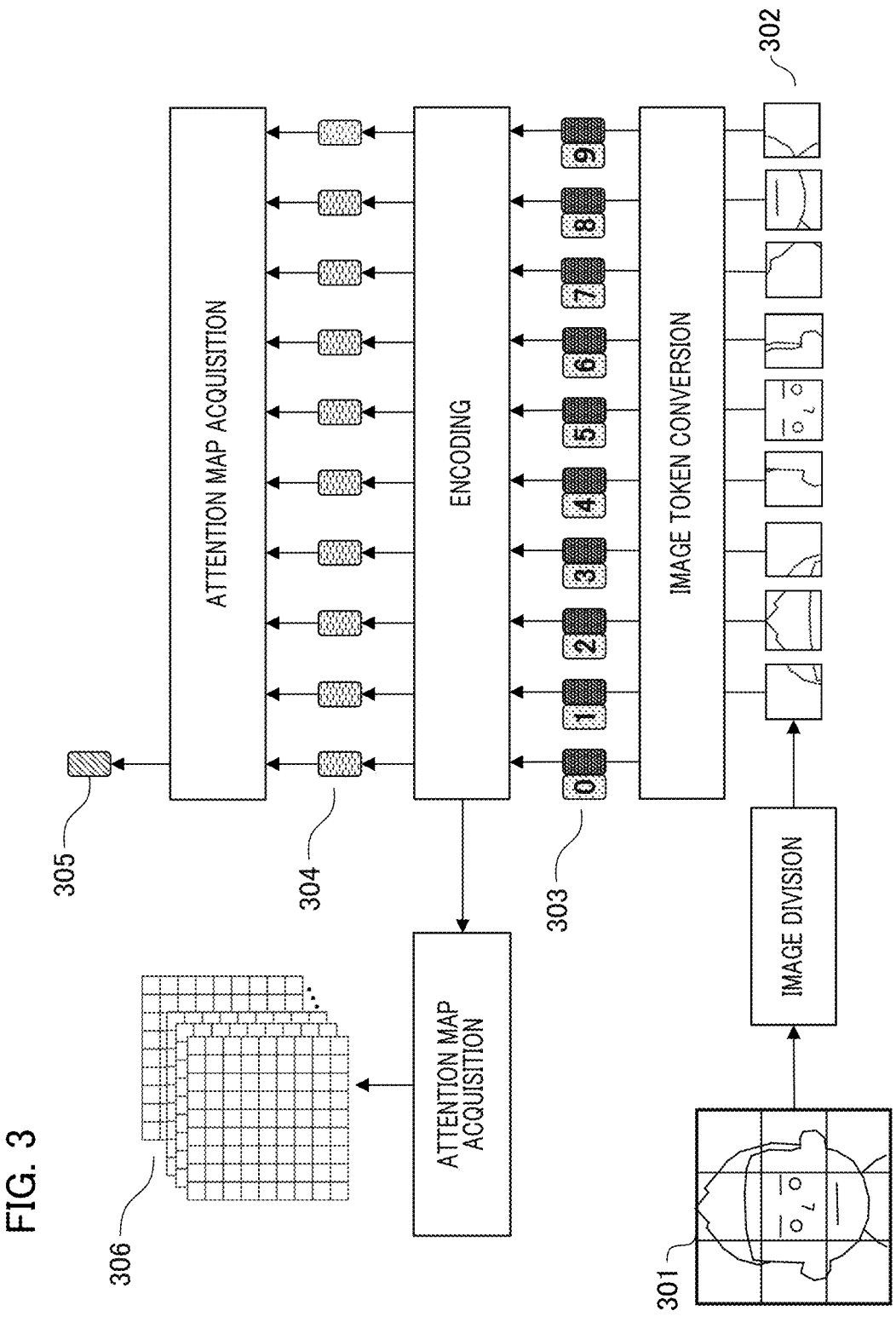
FIG. 3 is a schematic diagram illustrating a flow of processing of calculating a feature vector from the face image in the first embodiment.

FIG. 2 is a flowchart illustrating a flow of a feature vector calculation process of calculating a feature vector from a face image in the first embodiment. FIG. 3 is a schematic diagram illustrating a flow of processing of calculating a feature vector from the face image in the first embodiment.

Figure 4:
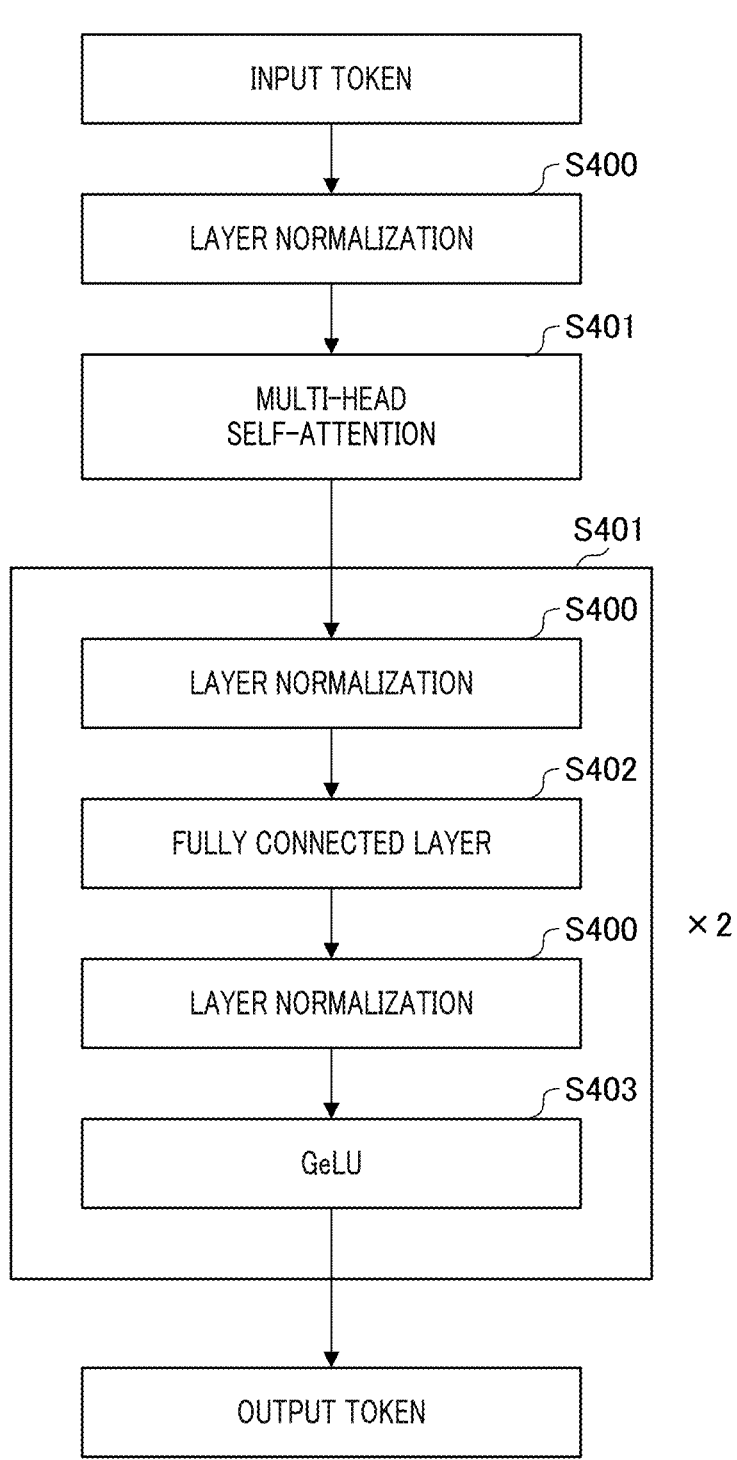
FIG. 4 is a flowchart illustrating a processing flow of a transformer encoder block of the first embodiment.

FIG. 4 is a flowchart illustrating a processing flow of a transformer encoder block of the first embodiment. Meanwhile, the operation of each step of the flowcharts of FIGS. 2 and 4 is performed by a CPU serving as a computer in an image processing device executing a computer program stored in a memory.

A procedure of calculating a feature vector from a face image will be described with reference to FIGS. 1 to 4. First, in step S101, the image acquisition unit 101 acquires a face image 301 as shown in FIG. 3 from an input image from a camera or an image storage unit. The width and height of the face image are set to W and H, respectively. Here, step S101 functions as an image acquisition step of acquiring an input image.

In step S102, the image division unit 102 divides the face image into partial images to obtain a partial image sequence 302 (see FIG. 3) which is a set of partial images of a predetermined size. The width and height of the partial image are set to PW and PH, respectively. If the number of partial images is set to N, the relation of $N = W \cdot H / PW \cdot PH$ is established.

Meanwhile, as disclosed in Literature 2, the partial images may be cut out from regions that partially overlap each other on a face image. Here, step S102 functions as a division step of dividing the input image into a plurality of partial images to obtain a partial image sequence.

Meanwhile, the process of obtaining a partial image sequence by dividing a face image may be performed after a convolutional neural network (CNN) is applied as disclosed in Literature 1. In that case, if the width and height of a feature map output by the CNN are set to FW and FH, respectively, the number of partial images is $N = FW \cdot FH / PW \cdot PH$. Meanwhile, the present embodiment is not limited to this.

In step S103, the image token conversion unit 103 converts the partial image sequence into a token sequence 303 (see FIG. 3) by converting the partial image into an image token which is a fixed D-dimensional vector. Further, for example, class tokens which are D-dimensional vectors of the same dimension initialized with random numbers are added to the token sequence.

The conversion from the partial image into image tokens is performed by first converting the partial images into PW- and PH-dimensional vectors through planarization thereof and then converting these images into D-dimensional vectors through the DNN. Here, step S103 functions as a token conversion step of converting a partial image sequence into a token sequence by converting the partial images into tokens having a fixed-dimensional vector.

The DNN is constituted by, for example, fully connected layers. The DNN need only be configured to convert PW- and PH-dimensional vectors into D-dimensional vectors, and is not limited to the present embodiment. Here, as in Literature 1, a position embedding vector which is a D-dimensional vector may be further added to each token included in the token sequence. By adding the position embedding vector, it is possible to hold position information on the face image of the partial image corresponding to each token.

The DNN and the class token are learnable parameters and are trained through a learning process to be described later in FIG. 6. Meanwhile, the class token may not be added. In that case, in step S105 to be described later, the feature vector acquisition unit 105 may calculate a feature vector from an encoded representation sequence corresponding to the token sequence converted from the partial image sequence.

In step S104, the encoding unit 104 obtains an encoded representation sequence 304 (see FIG. 3) by performing a process of updating each token once or more on the basis of the relationship between the tokens included in the token sequence through the DNN.

The DNN has a configuration in which transformer encoder blocks known from Literature 1 are multi-staged. Here, step S104 functions as an encoding step of obtaining the encoded representation sequence 304 by calculating an attention map indicating the degree of association between tokens to update the token sequence.

The processing flow of the transformer encoder block is shown in FIG. 4. Step S400 is a process based on layer normalization of a normalization layer, and step S401 is a process based on, for example, multi-head self-attention (hereinafter referred to as MHSA) disclosed in Japanese Patent No. 6884871.

Step S402 is a process of a fully connected layer, and step S403 is a process based on Gaussian error linear units (hereinafter referred to as GeLU) which is a non-linear activation function. In the flow of FIG. 4, an input token is processed to output an output token.

Step S401, which is a process based on MHSA in FIG. 4, is repeated twice. The configuration shown here is an example, and a process may be performed using batch normalization (hereinafter referred to as BN) as a normalization layer instead of step S400 based on layer normalization (hereinafter referred to as LN).

In addition, a process may be performed using a rectified linear unit (hereinafter referred to as ReLU) as a non-linear activation function instead of step S403 based on GeLU.

The number of repetitions of step S401 based on MHSA is arbitrary. A convolutional layer may be added. A vector of the same dimension as a token such as a position embedding vector may be added to the input of any layer. In addition, each transformer encoder block in the multi-stage DNN may be processed using configurations different from each other. Meanwhile, the DNN is trained through a learning process to be described later.

Here, step S401 based on MHSA will be described. Step S401 based on MHSA is a type of process called self-attention, and self-attention will be first described with reference to FIG. 5 as a schematic diagram.

Figure 5:
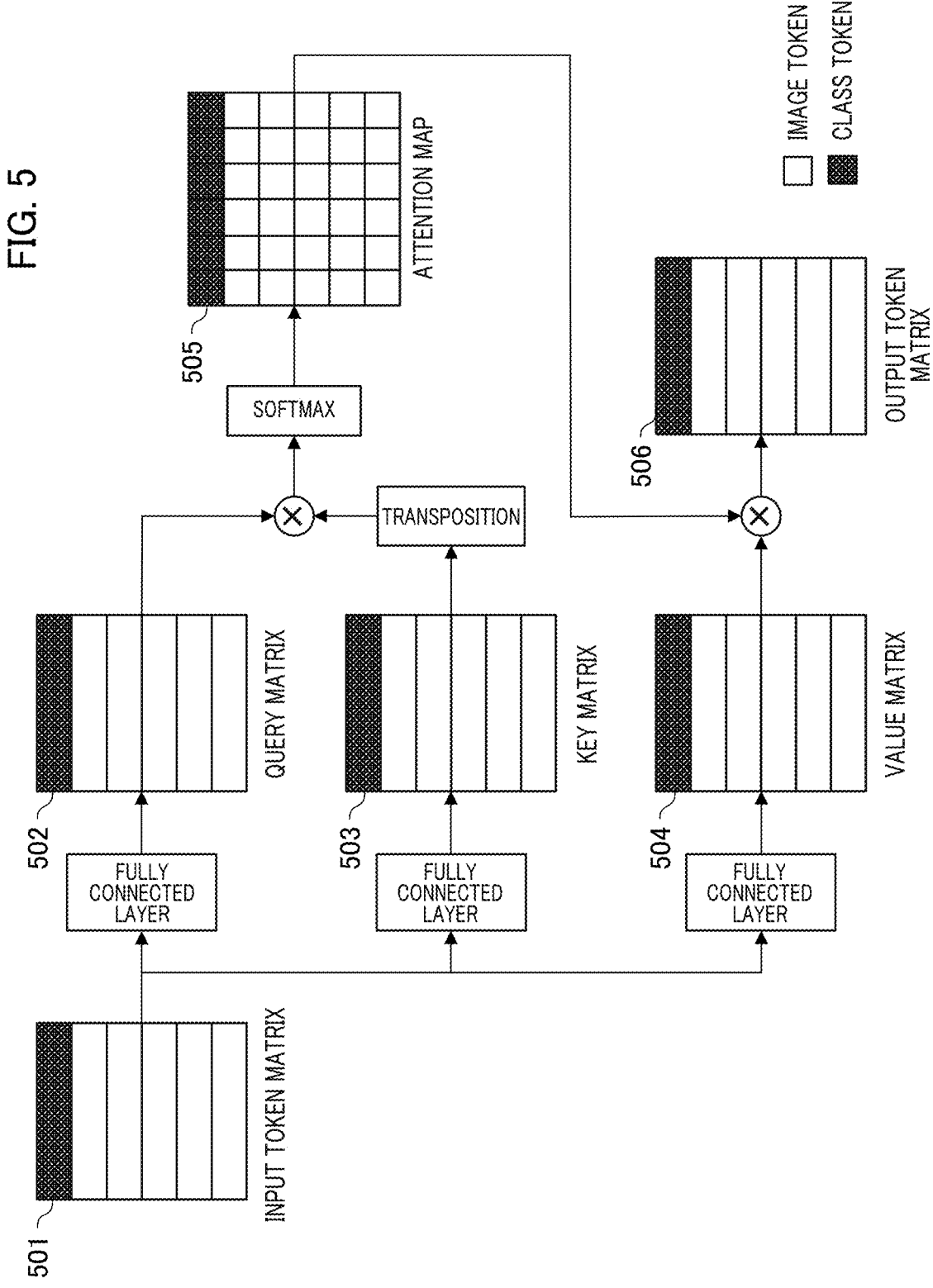
FIG. 5 is a schematic diagram illustrating a flow of self-attention in the first embodiment.

FIG. 5 is a schematic diagram illustrating a flow of self-attention in the first embodiment. For simplicity, it is assumed that the number of image tokens is five and the number of class tokens added to the image token is one. An input token matrix 501 is a matrix representation of a token sequence where row vectors are tokens.

First, three fully connected layers are applied to the input token matrix 501 to convert them into a query matrix 502, a key matrix 503, and a value matrix 504. Meanwhile, although there is one input token matrix in the example of FIG. 6, there may be separate input token matrices for the query matrix, the key matrix, and the value matrix.

Next, an attention map 505 is calculated by calculating the matrix product of the query matrix 502 and a matrix obtained by transposing the key matrix 503, dividing each element of the obtained matrix by D, and multiplying a Softmax function in a column direction.

The attention map 505 is a matrix of the number of tokens×the number of tokens (here, 6×6), and is normalized so that the element sum of each row vector is one. Each row vector of the attention map 505 represents how much attention should be paid to each token in order to acquire an encoded representation for a certain token.

For image tokens, tokens having a lot of information necessary to characterize the partial image corresponding to the token draw great attention, and for class tokens, tokens having information necessary to identify a person in the face image draw great attention.

Finally, the matrix product of the value matrix 504 and the attention map 505 is output as an output token matrix 506. Meanwhile, the configuration shown here is an example, and, for example, a fully connected layer may be further applied to the attention map 505.

In step S401 based on MHSA, the input token matrix 501 is divided into H pieces in the column direction (the dimension of the token is D/H), and after self-attention is applied to each of the divided input token matrices, they are connected to each other and integrated in the column direction.

This has the effect of preventing small features for each dimension from being easily ignored in high-dimensional vectors by dividing them into low-dimensional vectors. In step S401 based on MHSA, H attention maps 306 are calculated (see FIG. 3).

In step S105, the feature vector acquisition unit 105 acquires the encoded representation corresponding to the class token from the encoded representation sequence 304 obtained by the encoding unit, and outputs it as a feature vector 305.

Meanwhile, the acquisition of the encoded representation sequence corresponding to the class token is merely an example. If the image token conversion unit 103 does not add a class token in step S103, the feature vector 305 is calculated from the encoded representation sequence 304 corresponding to the token sequence converted from the partial image sequence. Here, step S105 functions as a feature vector acquisition step of obtaining a feature vector from the encoded representation sequence.

A method of calculating a feature vector may be, for example, weighted addition of a token sequence, or calculation of basic statistics such as the average or sum of each encoded representation. In addition, after the above-described process is performed or the encoded representation sequence is connected in the dimension direction, it may be converted into a vector of a predetermined number of dimensions through the DNN.

In addition, if the feature of the partial image corresponding to each encoded representation is extracted, the encoded representation sequence may be output as it is as a feature vector, or the application of the DNN to each encoded representation sequence may be output as a feature vector.

In step S106, the attention map acquisition unit 106 acquires and outputs the attention map 306 generated in step S401 based on each MHSA of the encoding unit. Next, a method of determining, when two input images (face images) are given, whether the two persons are the same person or different persons on the basis of the feature vector calculated by the feature vector calculation unit 100 will be described.

First, the above-described processes of steps S101 to S105 are performed for each of the two images. Thereby, feature vectors of the first image and the second image are calculated. The feature vectors are set to f1 and f2, respectively.

Next, the similarity score between the two feature vectors is calculated. A plurality of degrees of similarity may be used for the similarity score between feature vectors, and the angle between feature amount vectors is used, for example, as in the method in Literature 3. That is, the similarity score S is calculated as in the following Formula 1.
[Formula 1]

$$S(f_1, f_2) := \cos \theta_{12} = \frac{\langle f_1, f_2 \rangle}{\|f_1\| \|f_2\|}$$

Where, $\theta_{12}$ is the angle between the feature amount vectors f1 and f2, and <f1, f2> is the inner product of the feature amount vectors f1 and f2. Formula 2 is the Euclidean norm of the feature amount vectors f1 and f2.

$$\|f1\|, \|f2\|$$ [Formula 2]

If the similarity score S is equal to or less than a predetermined threshold, the same person is determined, and if not, a different person is determined.

Figure 6:
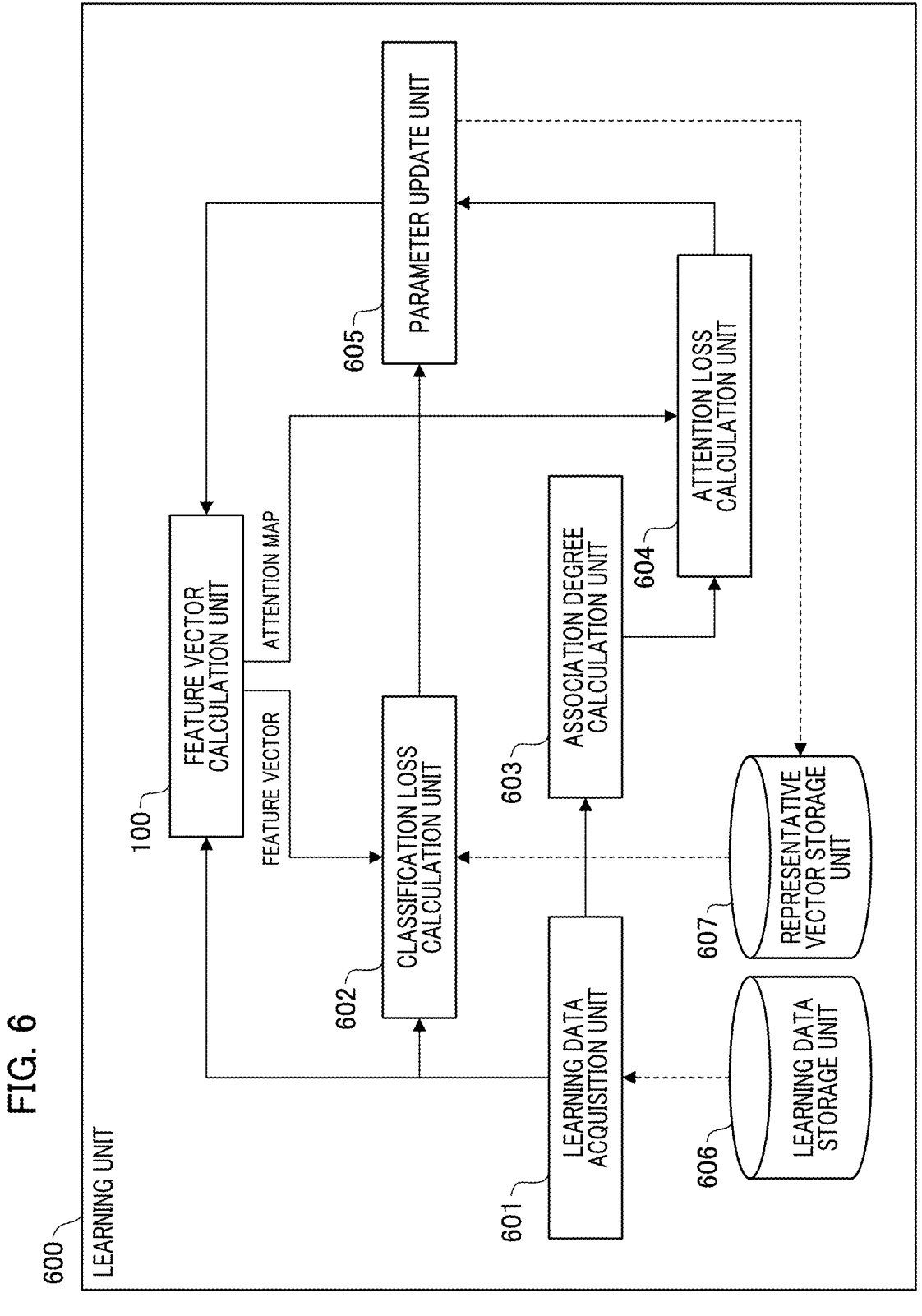
FIG. 6 is a functional block diagram illustrating a configuration example of the learning unit serving as an image processing device of the first embodiment.

FIG. 6 is a functional block diagram illustrating a configuration example of a learning unit serving as an image processing device of the first embodiment. A learning unit 600 includes a learning data acquisition unit 601, the feature vector calculation unit 100 of FIG. 1, a classification loss calculation unit 602, an association degree calculation unit 603, an attention loss calculation unit 604, a parameter update unit 605, a learning data storage unit 606, a representative vector storage unit 607, and the like.

Each functional configuration unit of the learning unit 600 will be described in detail. The learning data acquisition unit 601 acquires region information, an inter-region association degree map, and a face image set which are held by the learning data storage unit 606. The feature vector calculation unit 100 calculates feature vectors and attention maps from the face image set obtained by the learning data acquisition unit 601 as described above.

The classification loss calculation unit 602 calculates a classification loss value from the face image set obtained by the learning data acquisition unit 601, the feature vector obtained by the feature vector calculation unit 100, and the representative vector held by the representative vector storage unit. The association degree calculation unit 603 calculates an inter-token association degree map which is a correct value for calculating an attention loss from the region information, the degree of association between regions, and the face image set which are obtained by the learning data acquisition unit.

The attention loss calculation unit 604 calculates an attention loss value from the attention map obtained by the feature vector calculation unit 100 and the inter-token association degree map obtained by the association degree calculation unit 603.

The parameter update unit 605 updates at least parameters held by the parameter storage unit 107 on the basis of the classification loss value obtained by the classification loss calculation unit 602 and the attention loss value obtained by the attention loss calculation unit 604. In addition, the parameter update unit 605 updates the representative vector held by the representative vector storage unit 607 on the basis of the classification loss value and the attention loss value.

FIG. 7 is a flowchart illustrating a procedure of a learning process of the first embodiment. Meanwhile, the operation of each step of the flowchart of FIG. 7 is performed by the CPU serving as a computer in an image processing device executing a computer program stored in a memory.

Figure 8:
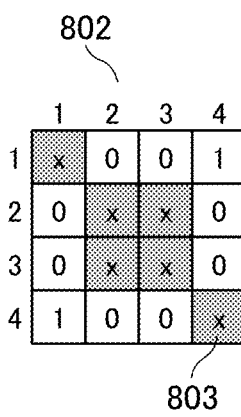
FIG. 8 is a schematic diagram of region information and an inter-region association degree map in the first embodiment.
Figure 10:
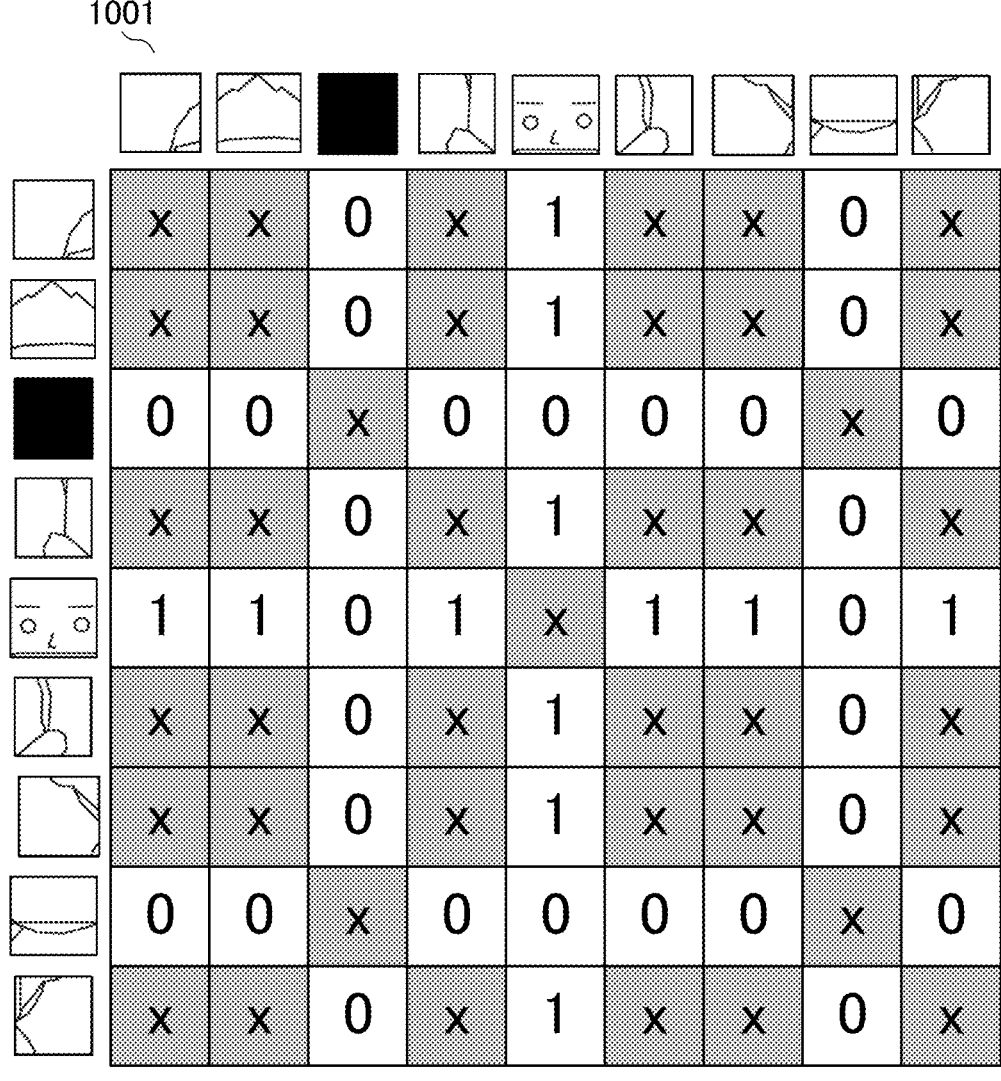
FIG. 10 is a schematic diagram of an inter-token association degree map of the first embodiment.

FIG. 8 is a schematic diagram of region information and an inter-region association degree map in the first embodiment, FIG. 9 is a schematic diagram of a face image set of the first embodiment, and FIG. 10 is a schematic diagram of an inter-token association degree map of the first embodiment.

The procedure of the learning process will be described with reference to FIGS. 1 and 6 to 10. Here, learning is performed using a known <representative vector method> as disclosed in Literature 4. The representative vector method is a method of learning face authentication in which a feature amount vector representing each person is set and used together to improve learning efficiency.

First, in step S201, the parameters of the image token conversion unit 103 and the encoding unit 104 held in the parameter storage unit 107 of the feature vector calculation unit 100 are initialized. Further, representative vectors v1 to vn held in the representative vector storage unit 607 of the learning unit 600 are initialized with random numbers. Here, 1 to n are IDs of all persons included in the learning image. Each representative vector v is a d-dimensional vector (d is a predetermined value).

In step S202, the learning data acquisition unit 601 acquires region information 801 and an inter-region association degree map 802 as shown in FIG. 8 from the learning data storage unit 606. The region information 801 is constituted by a region (left column) that needs to be controlled and its label ID (right column), and indicates the degree of association which is the degree of relevance to other regions.

In the example of FIG. 8, four regions are defined: a blackened region (label ID: 2) and a masked region (label ID: 3) as regions unnecessary for face authentication, a central region of the face (label ID: 4) as an important region for face authentication, and a normal region (label ID: 1). The inter-region association degree map 802 is a matrix whose elements are the target values of the degree of association between regions defined by the region information 801.

The size of the matrix is the number of types of regions× the number of types of regions, which is 4×4 in the example of FIG. 8. The element in the r-th row and s-th column of the inter-region association degree map indicates the correct value of the element in which the label ID of a partial image corresponding to a row in the attention map is r and the label ID of a partial image corresponding to a column is s, and is a real number that takes a value ranging from 0 to 1.

In the example of FIG. 8, by setting the degree of association of the central region of the face and the normal region with respect to the blackened region and the masked region as regions unnecessary for face authentication to 0, self-attention is trained so as not to collect (to ignore) information on a region unnecessary for face authentication. The region unnecessary for face authentication may be a sunglass region or a region of a wearable object that hides a portion of the face, and need only be a region of low contribution to the performance of face authentication.

By setting the degree of association of the normal region with respect to the central region of the face as an important region for face authentication to 1, self-attention is trained so as to collect information on an important region for face authentication. The important region for face authentication may be the region of facial organs such as the eyes and mouth, and need only be a region of high contribution to the performance of face authentication.

The value of the degree of association may be other values such as 0.9 or 0.1. A value 803 indicating NaN (Not a Number) is used for elements for which target values are not set. In the example of FIG. 8, although a set of region information and inter-region association degree map are acquired, different region information and inter-region association degree maps may be acquired for each head in step S401 based on each MI-ISA included in the encoding unit 104 of the feature vector calculation unit 100.

In step S203, the learning data acquisition unit 601 randomly acquires face image sets I1 to Im from the learning data storage unit 606. As shown in FIG. 9, each face image 901 is provided with person ID information 902 and a region label image 903. As shown in FIG. 9, the region label image 903 is constituted by a predetermined image according to the label ID for each region to which each pixel of the face image belongs, and has the same size as the face image.

In step S204, the feature vector calculation unit 100 calculates a feature vector fi and an attention map Ailh from each face image Ii of the above face image set. Here, the feature vector fi is a d-dimensional vector. The attention map Ailh is an attention map of an h-th head in step S401 based on the first MHSA included in the encoding unit 104 of the feature vector calculation unit 100.

In step S205, the classification loss calculation unit 602 calculates a classification loss value from the feature vector and the representative vector. Specifically, for example, the similarity (intra-class similarity) Sintra of the feature amount between each person and the representative vector and the similarity (inter-class similarity) Sinter between feature amounts of each person and the representative vector of another person are calculated on the basis of the following Formula 3.

$$S_{Intra}(f_i)=S(f_i,v_{a(i)}),$$

$$S_{Inter}(f^i)=\Sigma_{j\neq a(i)}S(f_i,v_j) \qquad \text{[Formula 3]}$$

Here, a(i) is the ID number of a person in the face image Ii. The classification loss value LCLS used for learning is obtained by summing this value for each face image as shown in the following Formula 4.

$$L_{CLS}=\Sigma_i(S_{Inter}(f_i)-\lambda S_{Intra}(f_i)) \qquad \text{[Formula 4]}$$

Here, $\lambda$ is a weight parameter for the balance of learning. Meanwhile, Formula 4 is an example of a formula for calculating a loss value, and various known methods such as using a similarity score with a margin or cross entropy may be used.

In step S206, the association degree calculation unit 603 calculates the inter-token association degree map from the inter-region association degree map and the region label image. Specifically, for example, an association degree map Ri is calculated from the region information 801, the inter-region association degree map 802, and the region label image corresponding to each face image. First, the label IDs within a range on the input image of the partial image and a corresponding range on the region label image are counted, and the label ID having the largest number of pixels among the label IDs is associated with the partial image.

In that case, a single label ID need only be able to be associated with each partial image, or each label ID may be prioritized and the one having the highest priority among the label IDs included in the range may be associated.

Next, an inter-token association degree map 1001 (see FIG. 10) is calculated. The inter-token association degree map is a matrix having a size of the number of tokens×the number of tokens, where the row and column correspond to the index of each token in the token sequence and the index of each partial image in the partial image sequence, respectively, The association degree map Ri(t, u) which is an element of the t-th row and u-th column of the inter-token association degree map is calculated by the following Formula 5. Here, one inter-token association degree map is calculated for all the attention maps corresponding to one face image Ii from a set of region information and inter-region association degree map.

However, a different inter-token association degree map may be calculated for each head in step S401 based on each MHSA included the encoding unit 104 of the feature vector calculation unit 100 from one or a plurality of sets of region information and inter-region association degree maps.

$$R_i(t,u)=R_{Region}((g(t),g(u)) \qquad \text{[Formula 5]}$$

Meanwhile, here, g(t) is a label ID to which the t-th partial image in the partial image sequence corresponds, and RRegion is an inter-region association degree map.

In step S207, the attention loss calculation unit 604 calculates an attention loss value LAttn from the attention map Ai and the association degree map Ri of each face image, for example, using the following Formula 6.

$$L_{Attn}=\Sigma_i\Sigma_l\Sigma_h\Sigma_t\Sigma_u|A_{ilh}(t,u)-R_i(t,u)|, \text{ if } R_i(t,u)\neq NaN \qquad \text{[Formula 6]}$$

Meanwhile, although the absolute error is used as the loss value in Formula 6, the squared error may be used. In addition, a loss value that brings a variable closer to the target value need only be used. For example, as in the following Formula 7, the error may be calculated only for elements of the attention map having values within a certain range. Meanwhile, T1 and T2 are thresholds for elements of the attention map, where T1<T2.

$$L_{Attn}=\Sigma_i\Sigma_l\Sigma_h\Sigma_t\Sigma_u|A_{ilh}(t,u)-R_i(t,u)|, \qquad \text{[Formula 7]}$$

if $R_i(t,u)\neq NaN$ and $A_{ilh}(t,u)\geq T_1$ and $A_{ilh}(t,u)\leq T_2$

By calculating the error only for elements within a certain range, self-attention forcibly weakens the attention between tokens to which strong attention is given, or forcibly strengthens the attention between tokens for which there is no attention at all. This can prevent adverse effects on learning.

Meanwhile, although the error with the same inter-token association degree map is calculated for all the attention maps in Formulas 6 and 7, the error with a different inter-token association degree map may be calculated for step S401 based on each MHSA or each head as in the following Formula 8.

$$L_{Atm} = \Sigma_i \Sigma_l \Sigma_h \Sigma_t \Sigma_u |A_{ilh}(t,u) - R_{ilh}(t,u)| \text{ if } R_{ilh}(t,u) \neq NaN \qquad \text{[Formula 8]}$$

Here, Rilh is an inter-token association degree map corresponding to the attention map Ailh. Meanwhile, although the sum of errors for the elements of all the attention maps is used as the attention loss value in Formulas 6 to 8, it may be a sum of errors for some attention maps, or a weighted sum of errors for the element of each attention map as in the following Formula 9.

$$L_{Atm} = \Sigma_i \Sigma_l \Sigma_h \Sigma_t \Sigma_u W_{ilh}(t,u) |A_{ilh}(t,u) - R_i(t,u)| \text{ if } R_i(t,u) \\ \neq NaN \qquad \text{[Formula 9]}$$

Here, Wilh(t, u) is a weight corresponding to Ailh(t, u). The weight may be the area ratio of the label ID corresponding to each partial image in the partial image, and the loss value may be calculated so that the error for the partial image with a large area ratio gives more importance.

In step S208, the parameter update unit 605 adjusts the parameters of the feature vector calculation unit 100 and the representative vector of each person so as to reduce loss. That is, the parameters of the image token conversion unit 103 and the encoding unit 104 held by the parameter storage unit 107 and the value of the representative vector held by the representative vector storage unit 607 are updated.

Specifically, by using a general error backpropagation method in the DNN, the weighted sum of the classification loss value obtained by the classification loss calculation unit 602 and the attention loss value obtained by the attention loss calculation unit 604 is updated slightly in the direction of decrease.

Thereby, the representative vector is improved to function more effectively as a value representing the feature of each person, and the feature vectors output by the feature vector calculation unit 100 are improved to resemble each other if they are the feature vectors of the same person. Therefore, each element of the attention map output by each self-attention of the feature vector calculation unit 100 is improved so as to approach the target value set in the inter-region association degree map 802.

Further, in step S209, it is determined whether the above learning has converged. If No, the process returns to step S203, and repeats a predetermined number of times until the learning process converges. If Yes in step S209, the process proceeds to step S210. In step S210, the parameters held by the parameter storage unit 107 of the feature vector calculation unit 100 are stored and saved, and the flow of FIG. 7 ends.

Here, steps S203 to S209 function as learning steps. In addition, in the learning step, the error between the target value of the degree of association between partial images and the attention map calculated from the input image in the encoding step is set as the attention loss value, and at least the parameter of the feature vector is adjusted so as to reduce the attention loss value.

In this way, according to the first embodiment, in self-attention, it is difficult to pay attention to a region unnecessary for face authentication, and more attention is paid to an important region for face authentication. Therefore, the performance of face authentication is improved by important information for face authentication being concentrated in each token.

Second Embodiment

A second embodiment has an image synthesis unit 1102 that synthesizes a region unnecessary for face authentication with a face image, and calculates an attention loss value for the face image that has undergone image synthesis. The same portions as those in the first embodiment will not be described, and only different points will be described.

In the first embodiment, learning is performed so as to reduce the attention of self-attention only for a region unnecessary for face authentication included in learning data. However, in the second embodiment, a region unnecessary for face authentication is generated on the face image through image synthesis, and learning is performed so as to reduce the attention of self-attention for the region.

This makes it difficult for self-attention to pay attention to a region having noise information which is not included in the learning data, and also makes it possible to increase the variation of noise information used for learning. Therefore, the effect of improving the performance of face authentication can be further enhanced.

Figure 11:
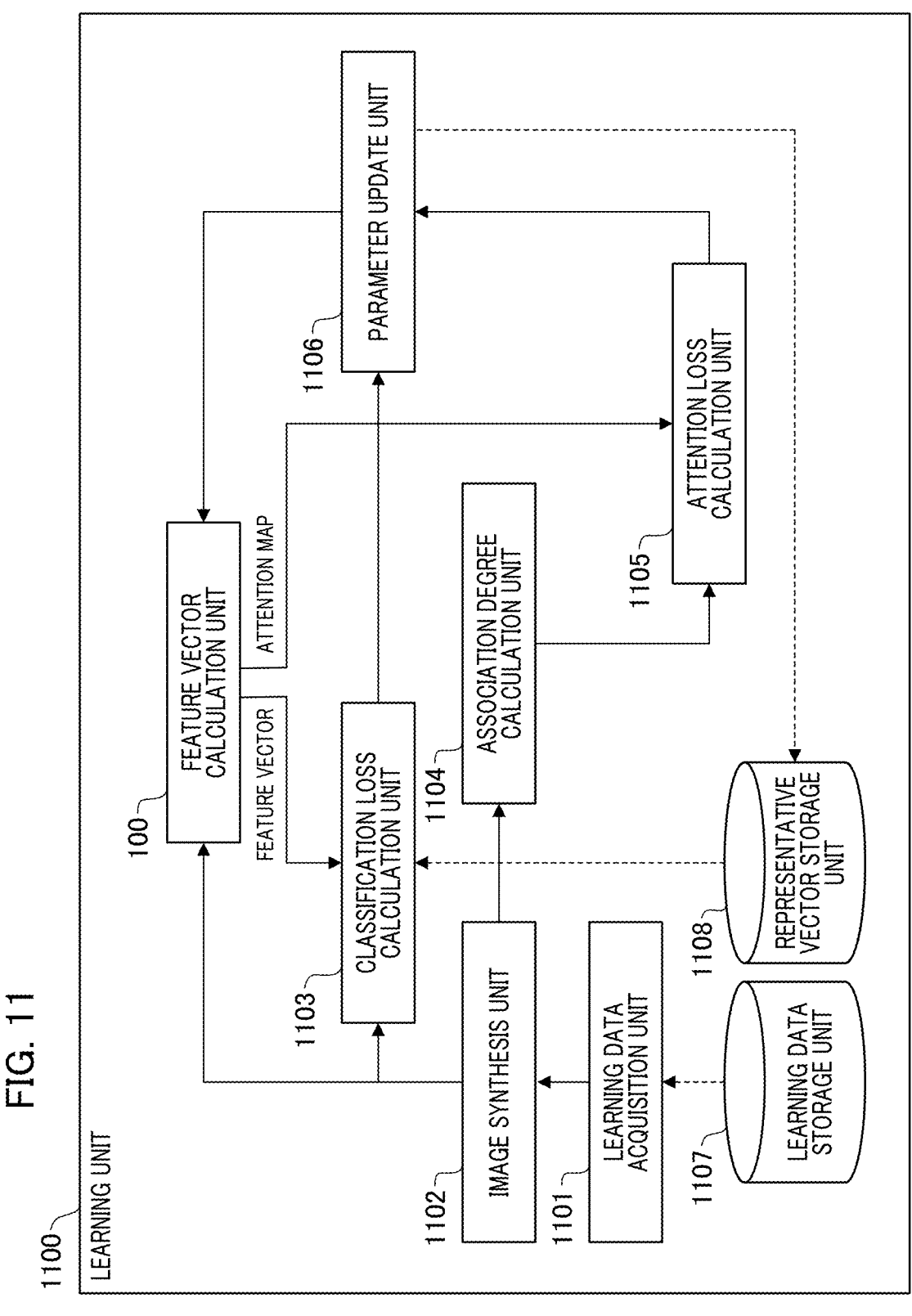
FIG. 11 is a functional block diagram illustrating a configuration example of a learning unit serving as an image processing device of a second embodiment.

Meanwhile, a process of calculating a feature vector from a face image in the second embodiment is the same as in the first embodiment, and thus description thereof will be omitted. FIG. 11 is a functional block diagram illustrating a configuration example of a learning unit serving as an image processing device of the second embodiment.

A learning unit 1100 includes a learning data acquisition unit 1101, the image synthesis unit 1102, the feature vector calculation unit 100, a classification loss calculation unit 1103, an association degree calculation unit 1104, an attention loss calculation unit 1105, and a parameter update unit 1106. In addition, the learning unit 1100 further includes a learning data storage unit 1107 and a representative vector storage unit 1108.

Each functional configuration unit of the learning unit 1100 will be described in detail. The learning data acquisition unit 1101 acquires region information, an inter-region association degree map, and a face image set which are held by the learning data storage unit 1107. The image synthesis unit 1102 synthesizes a region unnecessary for face authentication with the face image included in the face image set obtained by the learning data acquisition unit 1101, and updates the corresponding region label image.

The feature vector calculation unit 100 calculates a feature vector and an attention map from the face image set obtained by the image synthesis unit 1102. The classification loss calculation unit 1103 calculates a classification loss value from the face image set obtained by the image synthesis unit 1102, the feature vector obtained by the feature vector calculation unit 100, and the representative vector held by the representative vector storage unit.

The association degree calculation unit 1104 calculates an inter-token association degree map which is a correct value for calculating an attention loss value from the region information, the inter-region association degree map, and the face image set which are obtained by the learning data acquisition unit. The attention loss calculation unit 1105 calculates an attention loss value from the attention map obtained by the feature vector calculation unit and the inter-token association degree map obtained by the association degree calculation unit 1104.

The parameter update unit 1106 updates the parameters held by the parameter storage unit 107 on the basis of the classification loss value obtained by the classification loss calculation unit 1103 and the attention loss value obtained by the attention loss calculation unit. In addition, the parameter update unit 1106 updates the representative vector held by the representative vector storage unit 1108 on the basis of the classification loss value and the attention loss value.

Figure 12:
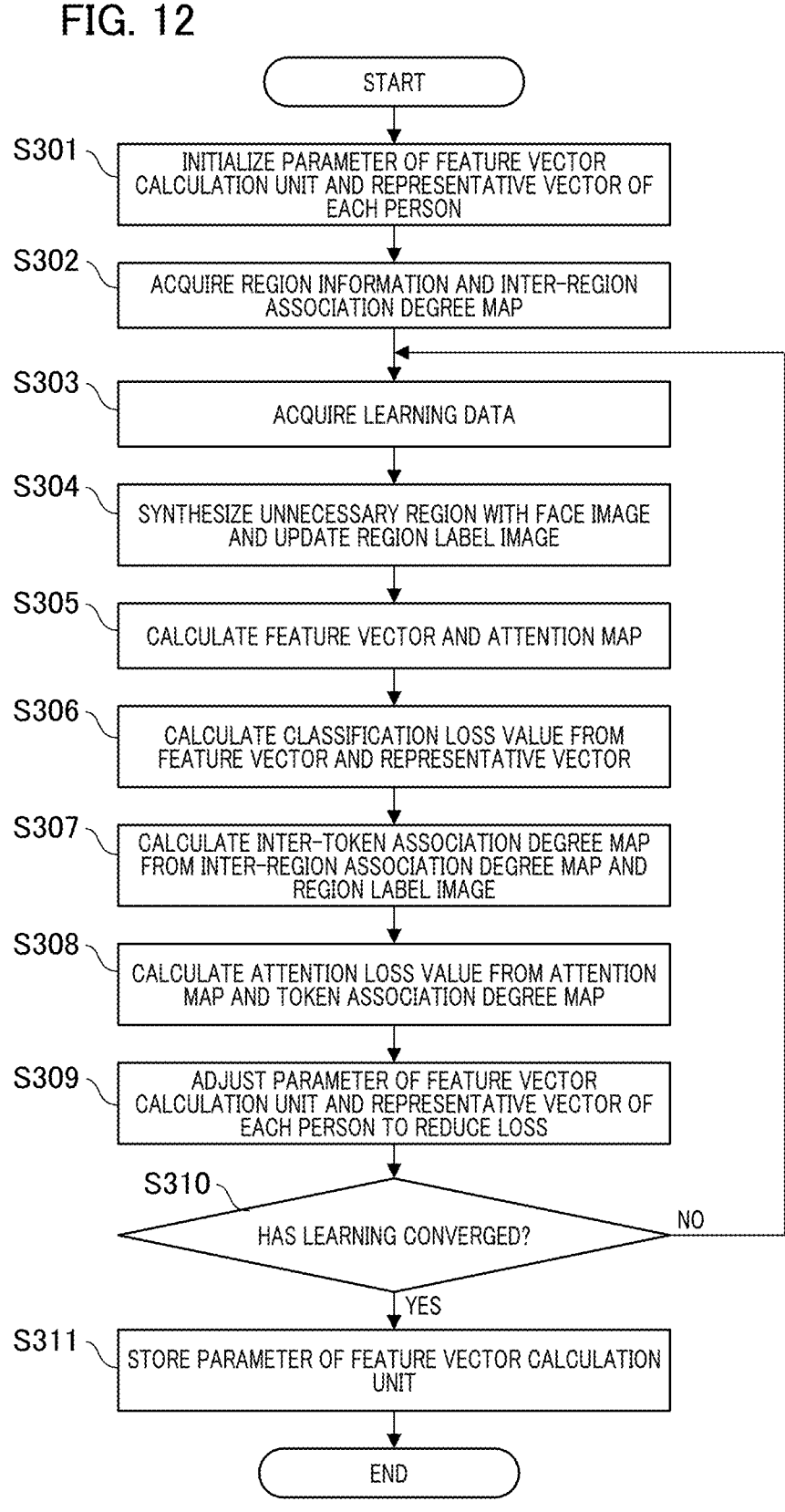
FIG. 12 is a flowchart illustrating a procedure of a learning process of the second embodiment.

FIG. 12 is a flowchart illustrating a procedure of a learning process of the second embodiment, and FIG. 13 is a schematic diagram of a face image set of the second embodiment. Meanwhile, the operation of each step of the flowchart of FIG. 12 is performed by the CPU serving as a computer in an image processing device executing a computer program stored in a memory.

FIG. 14 is a schematic diagram illustrating a procedure of an image synthesis process of the second embodiment. The procedure of the learning process of the second embodiment will be described with reference to FIGS. 1, 8, 10, and 12 to 14. Here, it is assumed that learning is performed using a <representative vector method> disclosed in Literature 4 similarly to the first embodiment. Meanwhile, the same portions as those in the first embodiment will not be described, and only different points will be described.

First, in step S301, the feature vector calculation unit 100 initializes the parameters of the image token conversion unit 103 and the encoding unit 104 held by the parameter storage unit 107. Further, the learning unit 1100 initializes the representative vector of each person held by the representative vector storage unit 1108.

In step S302, the learning data acquisition unit 1101 acquires the region information 801 and the inter-region association degree map 802 from the learning data storage unit 1107. The details of the region information and the inter-region association degree map and the acquisition method thereof are the same as in the first embodiment. Meanwhile, as will be described later, the region information and the inter-region association degree map define the information on a region to be synthesized in step S304 and the degree of association for the region.

In step S303, the learning data acquisition unit 1101 randomly acquires a face image set from the learning data storage unit 1107. As shown in FIG. 13, each face image 1301 is provided with person ID information 1302 and a region label image 1303. The region label image is constituted by a predetermined image corresponding to the label ID of a region to which each pixel of the face image belongs, and has the same size as the face image.

In step S304, as shown in FIG. 14, the image synthesis unit 1102 creates a synthesized face image 1401 by synthesizing a region unnecessary for face authentication with the face image 1301. In addition, as shown in FIG. 14, a synthesized region label image 1404 is created by updating the value of the region of the region label image 1303 corresponding to a synthesis location.

That is, in the example shown in FIG. 14, a masked image 1402 and a blackened image 1403 are synthesized with the face image, and corresponding regions on the region label image are updated as a masked region 1405 and a blackened region 1406.

The synthesis position of the regions may be randomly determined for each face image, or may be a fixed position. In addition, the synthesis position may be determined by randomly selecting it from candidates for positions that do not overlap an important region for recognition. It may be determined whether each region is probabilistically synthesized for each face image. In the example of FIG. 14, the entire image of the region unnecessary for face authentication is synthesized, but a portion of the image may be synthesized.

In step S305, the feature vector calculation unit 100 calculates a feature vector and an attention map from the above synthesized face image. The details of the feature vector and the attention map are the same as in the first embodiment.

In step S306, the classification loss calculation unit 1103 calculates a classification loss value from the feature vector and the representative vector. Specifically, for example, similarly to the first embodiment, intra-class similarity and inter-class similarity are calculated, and the classification loss value is calculated on the basis of these similarities. A method of calculating intra-class similarity and inter-class similarity may be the same as in the first embodiment.

In step S307, the association degree calculation unit 1104 calculates the inter-token association degree map 1001 from the region information, the inter-region association degree map, and the synthesized region label image. The details of the inter-token association degree map and the calculation method thereof are the same as in the first embodiment.

In step S308, the attention loss calculation unit 1105 calculates an attention loss value from the attention map and the association degree map of each face image. A method of calculating an attention loss value is the same as in the first embodiment.

In step S309, the parameter update unit 1106 adjusts the parameters of the feature vector calculation unit 100 and the representative vector of each person so as to reduce loss. That is, the parameters of the image token conversion unit 103 and the encoding unit 104 held by the parameter storage unit 107 and the value of the representative vector held by the representative vector storage unit 1108 are updated.

A method of updating parameters and a representative vector is the same as in the first embodiment. Further, in step S310, it is determined whether the above learning has converged. If No, the process returns to step S303, and repeats a predetermined number of times until the learning process converges.

If Yes in step S310, the process proceeds to step S311. In step S311, the parameters held by the parameter storage unit 107 of the feature vector calculation unit 100 are stored and saved, and the flow of FIG. 12 ends.

By adopting a configuration as in the second embodiment, in self-attention, it becomes difficult to pay attention to a region having noise information which is not included in learning data. In addition, since it is possible to easily increase the variation of noise information used for learning rather than collecting learning data having new noise information, the effect of improving the performance of face authentication can be further enhanced.

Third Embodiment

In a third embodiment, rectangle information and detection likelihood of a face in an image are estimated on the basis of a feature vector, a detection loss value is calculated on the basis of the rectangle information and the detection likelihood, and parameters are adjusted so that the detection loss value and the attention loss value are reduced.

A process of calculating a feature vector from an image, a process of estimating the position of a face on the image on the basis of the feature vector, and a learning process in the third embodiment will be described below. The same portions as those in the first embodiment will not be described, and only different points will be described.

Figure 15:
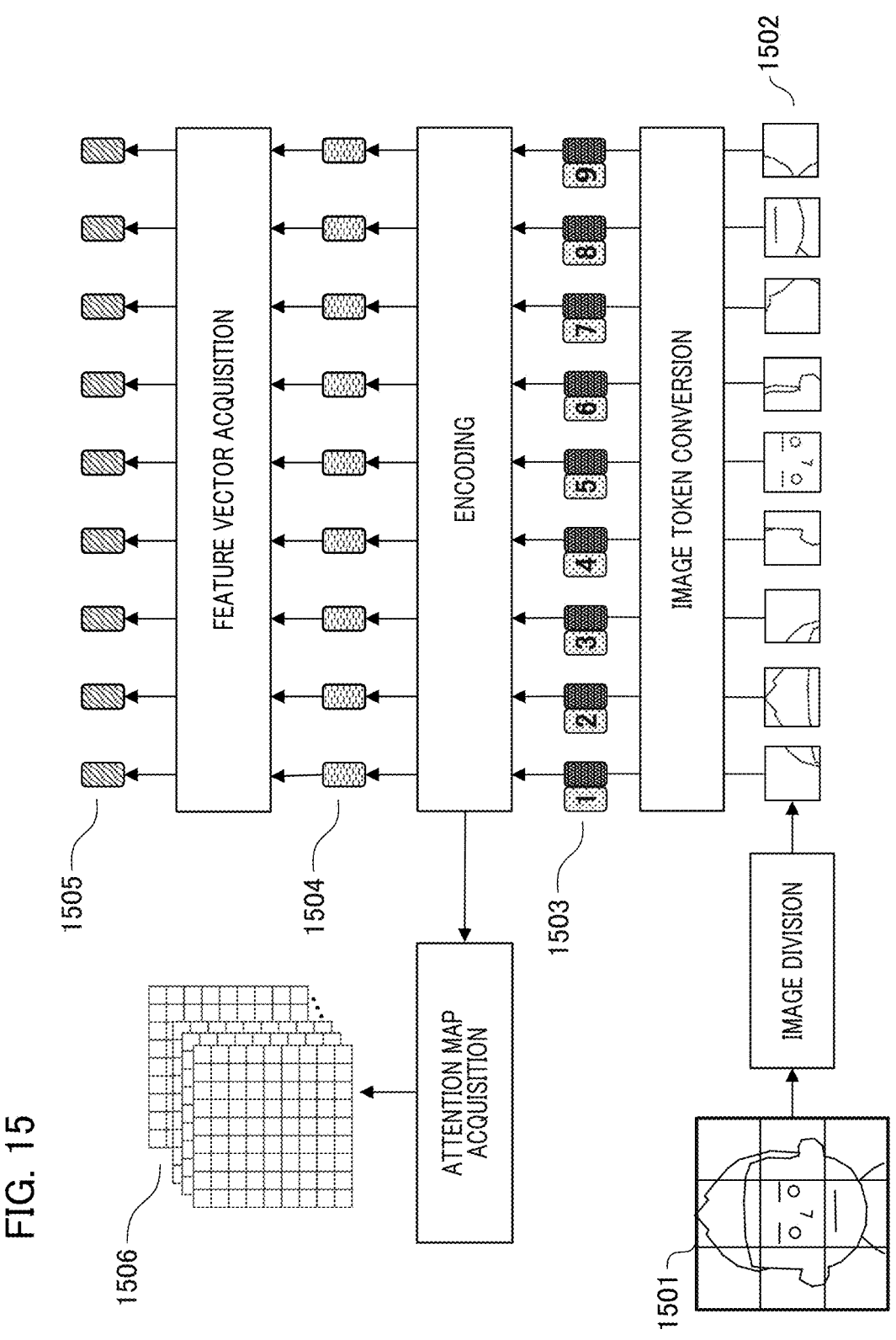
FIG. 15 is a schematic diagram illustrating a procedure of a feature vector calculation process of a third embodiment.

Meanwhile, the configuration example of a feature vector calculation unit of the third embodiment is the same as in FIG. 1, and a flow of processing of calculating a feature vector from the face image in the third embodiment is the same as in FIG. 2. FIG. 15 is a schematic diagram illustrating a procedure of a feature vector calculation process of the third embodiment. A procedure of calculating a feature vector from an image in the third embodiment will be described with reference to FIGS. 1, 2, and 15.

First, in step S101, the image acquisition unit 101 acquires an image 1501 in FIG. 15. In step S102, the image division unit 102 divides the face image into a partial image sequence 1502 (see FIG. 15) which is a set of partial images of a predetermined size. The division process is the same as in the first embodiment.

In step S103, the image token conversion unit 103 converts the partial image sequence into a token sequence 1503 (see FIG. 15) by converting the partial image into an image token which is a D-dimensional vector. In the third embodiment, since a feature vector corresponding to each partial image is required to be acquired in order to estimate whether a face is in a local region on the image, a class token is not added. The process of conversion into an image token is the same as in the first embodiment.

In step S104, the encoding unit 104 obtains an encoded representation sequence 1504 as shown in FIG. 15 by performing a process of updating each token once or more on the basis of the relationship between tokens included in the token sequence through the DNN.

The details of the token update process and the DNN are the same as in the first embodiment. In step S105, the feature vector acquisition unit 105 acquires the encoded representation sequence obtained by the encoding unit, as it is, as a feature vector sequence 1505.

In the first embodiment, a configuration in which encoded representation corresponding to a class token is acquired is adopted in order to obtain one feature vector from the entire image, whereas, in the third embodiment, it is inferred (estimated) whether there is a face with respect to the feature vector corresponding to each partial region.

Therefore, the encoded representation sequence 1504 corresponding to each partial image is acquired as the feature vector sequence 1505 as it is. In step S106, the attention map acquisition unit 106 acquires and outputs an attention map 1506 (see FIG. 15) generated in step S401 for each MHSA of the encoding unit 104.

Figure 16:
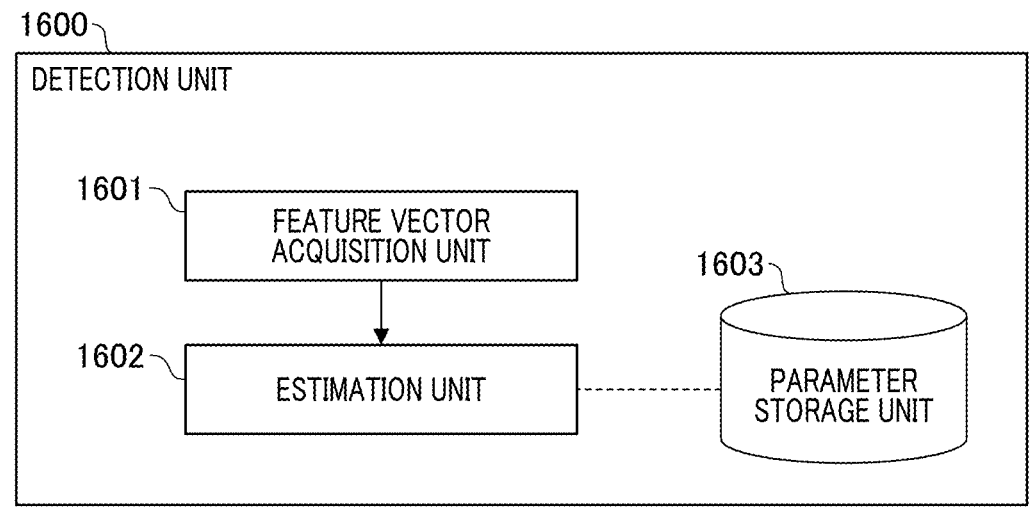
FIG. 16 is a functional block diagram illustrating a configuration example of a detection unit included in a learning unit serving as an image processing device of the third embodiment.

FIG. 16 is a functional block diagram illustrating a configuration example of a detection unit included in a learning unit serving as an image processing device of the third embodiment. A detection unit 1600 includes a feature vector acquisition unit 1601, an estimation unit 1602, and a parameter storage unit 1603. The feature vector acquisition unit 1601 includes 100 of which the configuration is shown in FIG. 1.

Figure 17:
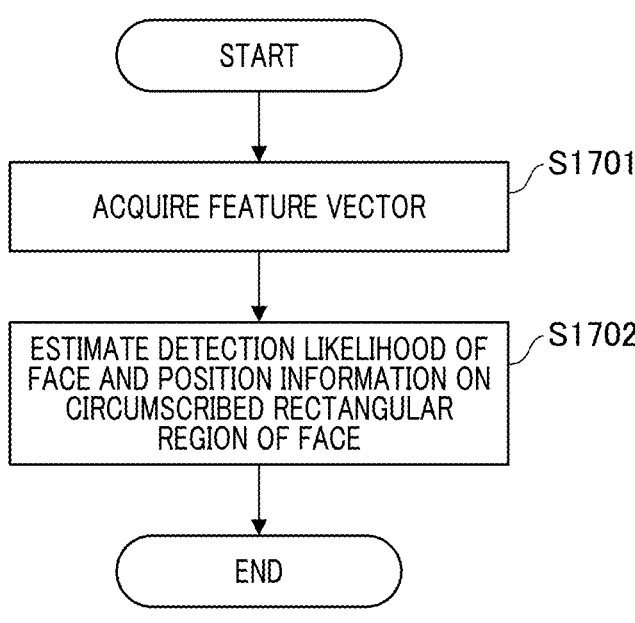
FIG. 17 is a flowchart illustrating a procedure of a detection process of the third embodiment.

FIG. 17 is a flowchart illustrating a procedure of a detection process of the third embodiment, and shows a flow of processing of estimating a circumscribed rectangle and detection likelihood of a face on an image from a feature vector. Meanwhile, the operation of each step of the flowchart of FIG. 17 is performed by the CPU serving as a computer in an image processing device executing a computer program stored in a memory.

Figure 18:
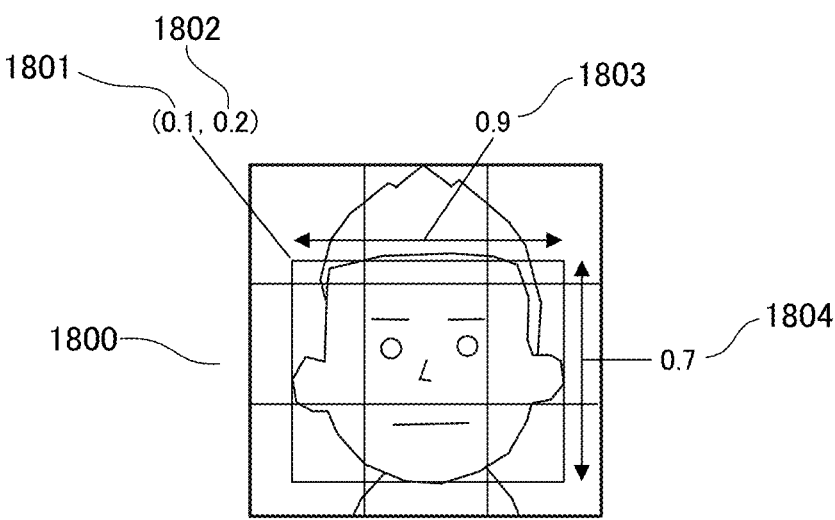
FIG. 18 is a schematic diagram of rectangle information of the third embodiment.

FIG. 18 is a schematic diagram of rectangle information of the third embodiment. A procedure of estimating a circumscribed rectangle and detection likelihood of a face on an input image from a feature vector will be described with reference to FIGS. 16 to 18.

In step S1701 of FIG. 17, the feature vector acquisition unit 1601 acquires a feature vector sequence. In step S1702, the estimation unit 1602 applies a DNN to each feature vector in the feature vector sequence to estimate (infer)

rectangle information (position information on circumscribed rectangular region) and detection likelihood from each feature vector.

As shown in FIG. 18, rectangle information 1800 consists of an x coordinate 1801 and a y coordinate 1802 at the upper left, a width 1803, and a height 1804 of the circumscribed rectangle of the face in the input image, and the detection likelihood is a real number that takes a value ranging from 0 to 1.

Here, the x coordinate and width are normalized to values obtained by dividing them by the width of the input image, and the y coordinate and height are normalized to values obtained by dividing them by the height of the input image. During inference in the estimation unit 1602, a threshold is set for the detection likelihood, and the rectangle information equal to or greater than the threshold is output as the circumscribed rectangle of the face. The DNN is constituted by one fully connected layer and a Sigmoid function, where the fully connected layer is linearly converts a D-dimensional feature vector into a 5-dimensional vector and the Sigmoid function is applied to output values ranging from 0 to 1.

Each dimension of the output vector corresponds to the rectangle information and detection likelihood. Meanwhile, the configuration shown here is an example, and if the rectangle information is output without being normalized, an activation function may be output without being applied.

In addition, if a plurality of face classes (for example, faces by attributes such as age and gender) are estimated, the Softmax function may be applied as the activation function by increasing the number of dimensions corresponding to the detection likelihood in the output vector. In addition, the number of layers of the DNN is arbitrary, and another fully connected layer and a normalization layer such as the activation function, BN, or LN may be added. The DNN is trained through a learning process to be described later.

Figure 19:
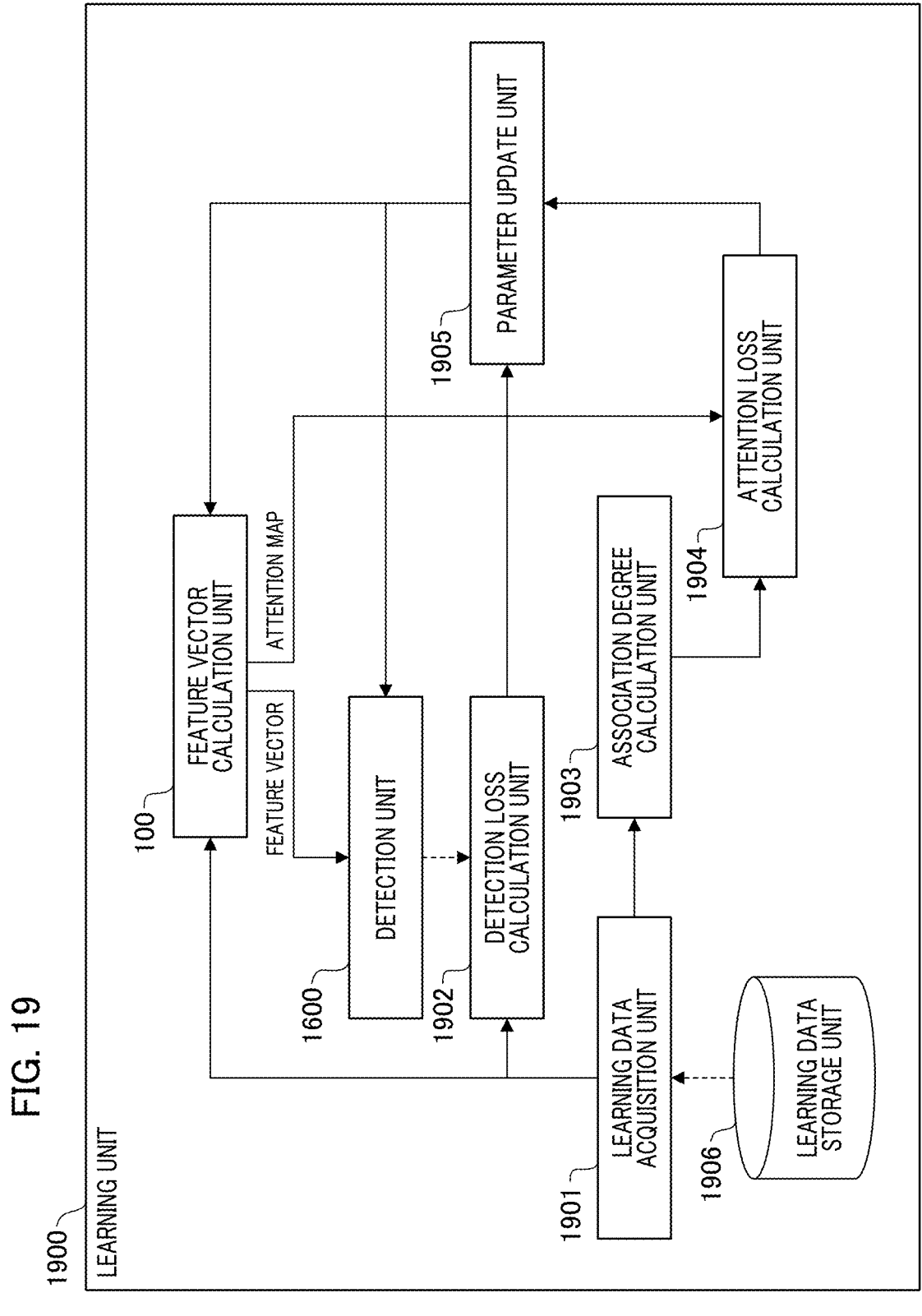
FIG. 19 is a functional block diagram illustrating a configuration example of the learning unit serving as an image processing device of the third embodiment.

FIG. 19 is a functional block diagram illustrating a configuration example of a learning unit serving as an image processing device of the third embodiment. A learning unit 1900 includes a learning data acquisition unit 1901, the feature vector calculation unit 100, the detection unit 1600 in FIG. 16, a detection loss calculation unit 1902, an association degree calculation unit 1903, an attention loss calculation unit 1904, a parameter update unit 1905, and a learning data storage unit 1906.

Each functional configuration unit of the learning unit 1900 will be described in detail. The learning data acquisition unit 1901 acquires region information, an inter-region association degree map, and an image set which are held by the learning data storage unit 1906. The feature vector calculation unit 100 calculates a feature vector and an attention map from the image set obtained by the learning data acquisition unit.

The detection unit 1600 estimates the rectangle information and detection likelihood from the feature vector obtained by the feature vector calculation unit 100. The detection loss calculation unit 1902 calculates a detection loss value from the face image set obtained by the learning data acquisition unit 1901 and the rectangle information and detection likelihood obtained by the detection unit 1600.

The association degree calculation unit 1903 calculates an inter-token association degree map which is a correct value for calculating an attention loss value from the region information, the inter-region association degree map, and the face image set obtained by the learning data acquisition unit 1901.

The attention loss calculation unit 1904 calculates an attention loss value from the attention map obtained by the feature vector calculation unit and the inter-token association degree map obtained by the association degree calculation unit 1903.

The parameter update unit 1905 updates at least the parameters held by the parameter storage unit 109 on the basis of the detection loss value obtained by the detection loss calculation unit 1902 and the attention loss value obtained by the attention loss calculation unit 1904. In addition, the parameter update unit 1905 further updates the parameters held by the parameter storage unit 1603 on the basis of the detection loss value and the attention loss value.

FIG. 20 is a flowchart illustrating a procedure of a learning process of the third embodiment. Meanwhile, the operation of each step of the flowchart of FIG. 20 is performed by the CPU serving as a computer in an image processing device executing a computer program stored in a memory.

FIG. 21 is a schematic diagram of a face image set of the third embodiment. The procedure of the learning process of the third embodiment will be described with reference to FIGS. 1, 10, 16, and 19 to 21. The same portions as those in the first embodiment will not be described, and only different points will be described.

First, in step S501, the parameters of the image token conversion unit 103 and the encoding unit 104 held by the parameter storage unit 107 are initialized. Further, the parameters of the estimation unit 1602 held by the parameter storage unit 1603 are initialized.

In step S502, the learning data acquisition unit 1901 acquires the region information 801 and the inter-region association degree map 802 from the learning data storage unit 1906. The details of the region information and the inter-region association degree map and the acquisition method thereof are the same as in the first embodiment.

In step S503, the learning data acquisition unit 1901 randomly acquires face image sets I1 to Im from the learning data storage unit 1906. As shown in FIG. 21, each face image 2101 is provided with correct rectangle information 2102 and a region label image 2107. The correct rectangle information consists of an x coordinate 2103 and a y coordinate 2104 at the upper left, a width 2105, and a height 2106 of the circumscribed rectangle of the face in the input image.

Here, the x coordinate and width are normalized to values obtained by dividing them by the width of the input image, and the y coordinate and height are normalized to values obtained by dividing them by the height of the input image. The region label image 2107 is constituted by a predetermined image corresponding to the label ID of a region to which each pixel of the face image belongs, and has the same size as the face image.

In step S504, the feature vector calculation unit 100 calculates a feature vector and an attention map from the face image. The details of the feature vector and the attention map are the same as in the first embodiment.

In step S505, the detection unit 1600 estimates rectangle information and detection likelihood from the feature vector. In step S506, the detection loss calculation unit 1902 calculates a detection loss value from correct rectangle information, rectangle information, and detection likelihood. In order to calculate the detection loss value, a detection likelihood loss value LDET1 and a rectangle information loss value LDET2 are calculated. The detection likelihood loss value LDET1 is calculated using the following Formula 10.

$$L_{DET1} = -\Sigma_i \Sigma_n p'_{in} \log 9_{in} \qquad \text{[Formula 10]}$$

Here, pin is the detection likelihood for the n-th partial image of the face image Ii, and p' in is a value of 1 if the central coordinates of the rectangle in the correct rectangle information of the face image Ii are included in the n-th partial image of the face image Ii, and is a value of 0 if not. The rectangle information loss value LDET2 is calculated using the following Formula 11.

$$L_{DET2} = \Sigma_i \Sigma_n (|x_i - x'_i| + |y_i - y'_i| + |w_i - w'_i| + |h_i - h'_i|) \qquad \text{[Formula 11]}$$

Here, x'i, y'i, w'i, and h'i are the x coordinate, y coordinate, width, and height of the correct rectangle information of the face image Ii, respectively. In addition, xi, yi, wi, and hi are the x coordinate, y coordinate, width, and height of the rectangle information, respectively, corresponding to the partial image of the face image Ii which includes the central coordinates of the rectangle in the correct rectangle information of the face image Ii. A weighted addition of this as in the following Formula 12 is a detection loss value LDET.

$$L_{DET} = \lambda_1 L_{DET1} + \lambda_2 L_{DET2} \qquad \text{[Formula 12]}$$

Here, $\lambda_1$ and $\lambda_2$ are weight parameters for the balance of learning. Meanwhile, Formula 12 is an example of a formula for calculating a detection loss value, and various known methods such as using generalized intersection over union (GIoU) indicating the degree of overlap between rectangular regions may be used.

In step S507, the association degree calculation unit 1903 calculates the inter-token association degree map 1001 from the region information, the inter-region association degree map, and the region label image. The details of the inter-token association degree map and the calculation method thereof are the same as in step S206 of the first embodiment.

In step S508, the attention loss calculation unit 1904 calculates an attention loss value from the attention map and the association degree map of each face image. A method of calculating an attention loss value is the same as in step S207 of the first embodiment.

In step S509, the parameter update unit 1905 adjusts the parameters of the feature vector calculation unit 100 and the representative vector of each person so as to reduce loss. That is, the parameters of the image token conversion unit 103 and the encoding unit 104 held by the parameter storage unit 107 and the parameters of the estimation unit 1602 held by the parameter storage unit 1603 are updated.

Specifically, by using a general error backpropagation method in the DNN, the weighted sum of the detection loss value obtained by the detection loss calculation unit 1902 and the attention loss value obtained by the attention loss calculation unit 1904 is updated slightly in the direction of decrease. That is, the learning unit adjusts at least the parameters of the feature vector so that the detection loss value and the attention loss value are reduced.

Thereby, the detection unit is improved to output a high detection likelihood and accurate rectangle information for faces. In addition, each element of the attention map output by each self-attention of the feature vector calculation unit 100 is improved to approach the target value set in the inter-region association degree map 802.

Further, in step S510, it is determined whether the above learning has converged. If No, the process returns to step S503, and repeats a predetermined number of times until the learning process converges. If Yes in step S510, the process proceeds to step S511.

In step S511, the parameters held by the parameter storage unit 107 of the feature vector calculation unit 100 and the parameters held by the parameter storage unit 1603 of the detection unit 1600 are stored and saved, and the flow of FIG. 20 ends.

With such a configuration as in the third embodiment, it becomes difficult to pay attention to a region unnecessary for face detection in self-attention, and it becomes possible to pay more attention to an important region for face detection. Thereby, the performance of face detection is improved by important information for face detection being concentrated in each token.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2022-135676, filed on Aug. 29, 2022, which is hereby incorporated by reference herein in its entirety.

What is claimed is:

1. An image processing device comprising:
at least one processor; and a memory coupled to the at least one processor, the memory storing instructions that, when executed by the at least one processor, cause the at least one processor to:
acquire an input image;
divide the input image into a plurality of partial images to obtain a partial image sequence;
convert the partial image sequence into a token sequence by respectively converting each of the partial images includes in the partial image sequence into a token having a fixed-dimensional vector;
obtain an encoded representation sequence based on an attention map indicating a degree of association between tokens and the token sequence;
obtain a feature vector from the encoded representation sequence;
adjust at least parameters for converting the partial image sequence into a token sequence unit and for obtaining the encoded representation sequence to reduce an attention loss value, wherein the attention loss value corresponds to an error between a target value of the degree of association between the partial images and a value indicated by the attention map;
convert the partial image sequence obtained by the division unit into the token sequence, and adds a class token having a vector of the same dimension as the token to the token sequence; and
acquire the encoded representation sequence by updating the token sequence to which the class token is added based on the attention map.

2. The image processing device according to claim 1, wherein the instructions when executed by the processor further cause the image processing device to: obtain, as the feature vector, the encoded representation corresponding to the class token from the encoded representation sequence obtained.

3. The image processing device according to claim 1, wherein the input image is an image including a face of person, and it is determined whether persons included in two input images are the same on the basis of the feature vectors corresponding to the two input images.

4. The image processing device according to claim 3, wherein the instructions when executed by the processor further cause the image processing device to: adjust a representative vector of each person to reduce the attention loss value.

5. The image processing device according to claim 1, wherein the input image is an image including a face of person, and the feature vector is used to estimate a position on the input image of the face of the person included in the input image.

6. The image processing device according to claim 1, wherein instructions when executed by the processor further cause the image processing device to: adjust at least parameters of the token conversion and the encoding to reduce the attention loss value.

7. The image processing device according to claim 1, wherein the instructions when executed by the processor further cause the image processing device to:
synthesize a region unnecessary for face authentication with a face image and calculate the attention loss value for the face image that has undergone image synthesis.

8. The image processing device according to claim 1, wherein the instructions when executed by the processor further cause the image processing device to:
estimate rectangle information and detection likelihood of a face in an image on the basis of the feature vector;
calculate a detection loss value on the basis of the rectangle information and the detection likelihood, and
adjust at least the parameters of the feature vector so that the detection loss value and the attention loss value are reduced.

9. An image processing method comprising:
acquiring an input image;
dividing the input image into a plurality of partial images to obtain a partial image sequence;
converting the partial image sequence into a token sequence by respectively converting each of the partial images includes in the partial image sequence into a token having a fixed-dimensional vector;
adding a class token having a vector of the same dimension as the token to the token sequence;
obtaining an encoded representation sequence based on an attention map indicating a degree of association between tokens and the token sequence;
obtaining a feature vector from the encoded representation sequence obtained by the encoding;
learning to adjust at least parameters for converting the partial image sequence into a token sequence unit and for obtaining the encoded representation sequence to reduce an attention loss value, wherein the attention loss value corresponds to an error between a target value of the degree of association between the partial images and a value indicated by the attention map calculated by the encoding; and
acquiring the encoded representation sequence by updating the token sequence to which the class token is added based on the attention map.

10. A non-transitory computer-readable storage medium storing a computer program including instructions for executing following processes:
acquiring an input image;

dividing the input image into a plurality of partial images to obtain a partial image sequence;

converting the partial image sequence into a token sequence by respectively converting each of the partial images includes in the partial image sequence into a token having a fixed-dimensional vector;

adding a class token having a vector of the same dimension as the token to the token sequence;

obtaining an encoded representation sequence based on an attention map indicating a degree of association between tokens and the token sequence;

obtaining a feature vector from the encoded representation sequence obtained by the encoding; and learning to adjust at least parameters for converting the partial image sequence into a token sequence unit and for obtaining the encoded representation sequence to reduce an attention loss value, wherein the attention loss value corresponds to an error between a target value of the degree of association between the partial images and a value indicated by the attention map calculated by the encoding; and acquiring the encoded representation sequence by updating the token sequence to which the class token is added based on the attention map.

11. An image processing device comprising:

at least one processor; and a memory coupled to the at least one processor, the memory storing instructions that, when executed by the at least one processor, cause the at least one processor to:

acquire an input image;

divide the input image into a plurality of partial images to obtain a partial image sequence;

convert the partial image sequence into a token sequence by respectively converting each of the partial images includes in the partial image sequence into a token having a fixed-dimensional vector;

obtain an encoded representation sequence based on an attention map indicating a degree of association between tokens and the token sequence;

obtain a feature vector from the encoded representation sequence;

adjust at least parameters for converting the partial image sequence into a token sequence unit and for obtaining the encoded representation sequence to reduce an attention loss value, wherein the attention loss value corresponds to an error between a target value of the degree of association between the partial images and a value indicated by the attention map; and synthesize a region unnecessary for face authentication with a face image and calculate the attention loss value for the face image that has undergone image synthesis.

12. An image processing device comprising:

at least one processor; and a memory coupled to the at least one processor, the memory storing instructions that, when executed by the at least one processor, cause the at least one processor to:

acquire an input image;

divide the input image into a plurality of partial images to obtain a partial image sequence;

convert the partial image sequence into a token sequence by respectively converting each of the partial images includes in the partial image sequence into a token having a fixed-dimensional vector;

obtain an encoded representation sequence based on an attention map indicating a degree of association between tokens and the token sequence;

obtain a feature vector from the encoded representation sequence;

adjust at least parameters for converting the partial image sequence into a token sequence unit and for obtaining the encoded representation sequence to reduce an attention loss value, wherein the attention loss value corresponds to an error between a target value of the degree of association between the partial images and a value indicated by the attention map;

estimate rectangle information and detection likelihood of a face in an image on the basis of the feature vector;

calculate a detection loss value on the basis of the rectangle information and the detection likelihood, and adjust at least the parameters of the feature vector so that the detection loss value and the attention loss value are reduced.

* * * * *